United States Patent
Tiderington

[19]

[11] Patent Number: 5,985,158
[45] Date of Patent: Nov. 16, 1999

[54] REMOVABLE DOWNSPOUT DEBRIS TRAP ASSEMBLY

[76] Inventor: Kenneth M. Tiderington, 311 Fieldston, Bellingham, Wash. 98225

[21] Appl. No.: 08/965,480

[22] Filed: Nov. 6, 1997

[51] Int. Cl.⁶ .................................................. B01D 35/02
[52] U.S. Cl. .......................... 210/767; 210/447; 210/448; 210/86; 52/12; 52/16
[58] Field of Search .................................... 210/767, 446, 210/447, 448, 454, 499, 86; 52/12, 16

[56] References Cited

U.S. PATENT DOCUMENTS

| | | | |
|---|---|---|---|
| 289,473 | 12/1883 | Van Tassel | 210/447 |
| 527,400 | 10/1894 | Barth | 210/447 |
| 543,922 | 8/1895 | Buckley | 210/447 |
| 1,044,601 | 11/1912 | Thiem | 210/447 |
| 1,076,075 | 10/1913 | Steele | 210/447 |
| 1,653,473 | 12/1927 | Schulz | 210/447 |
| 2,887,073 | 5/1959 | Thompson . | |
| 3,628,668 | 12/1971 | Huppert | 210/446 |
| 4,183,368 | 1/1980 | Husted | 52/16 |
| 4,615,153 | 10/1986 | Cary | 52/12 |
| 4,798,028 | 1/1989 | Pinion | 52/16 |
| 4,801,377 | 1/1989 | Bolt | 210/446 |

*Primary Examiner*—Robert J. Popovics
*Attorney, Agent, or Firm*—Hughes & Schacht, P.S.; Robert B. Hughes

[57] ABSTRACT

A debris trap assembly for use with downspouts connected to a rain gutter system. The debris trap assembly replaces the portion of the downspout from about waist height down to the drain tile connection. Rain water is carried by the downspout to the debris trap assembly where it flows through a strainer housing containing a strainer cup. The strainer cup accumulates the debris collected by the rain gutters and flushed down the downspout by the rain water. The strainer cup has a special shape that allows it to occupy nearly all the space in the housing while still being removable through an access opening to empty the debris from the cup. An indicator built into the strainer cup displays when the strainer cup needs to be emptied. To empty the strainer cup, it is first removed from the housing and then dumped in either the garbage or a compost pile. The strainer cut is then easily replaced into the strainer housing. In the event that the strainer cup is not emptied when full, a set of emergency drains conducts the rain water out of the debris trap assembly and directs it to the ground and away from the building.

20 Claims, 18 Drawing Sheets

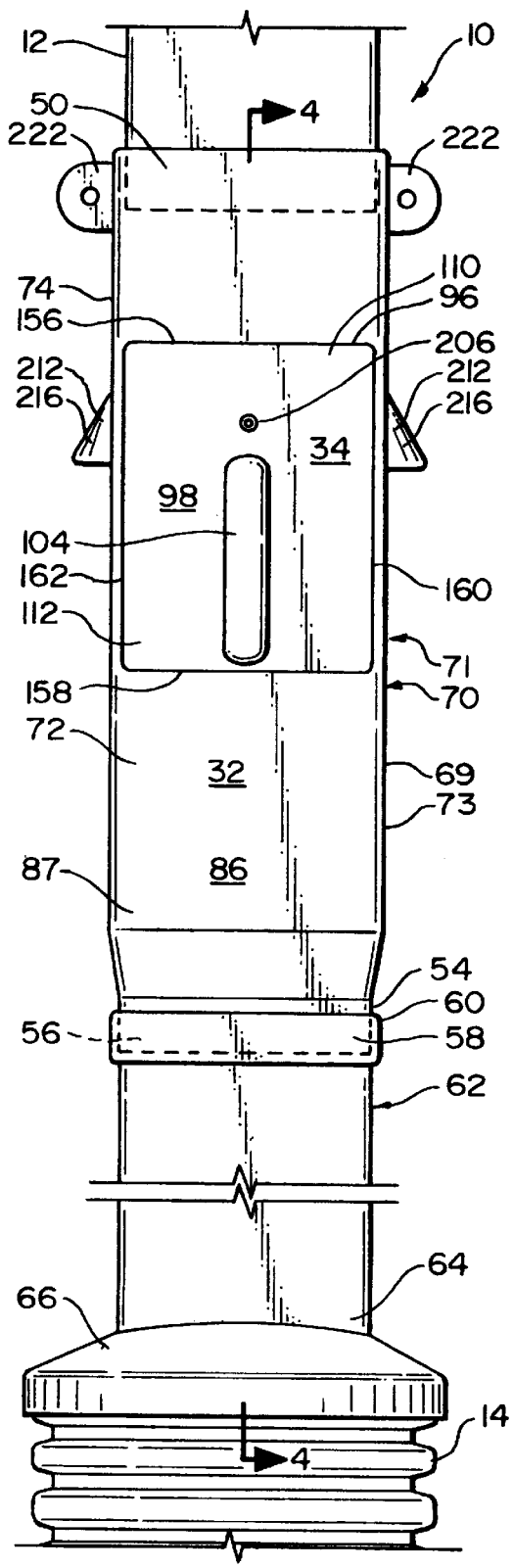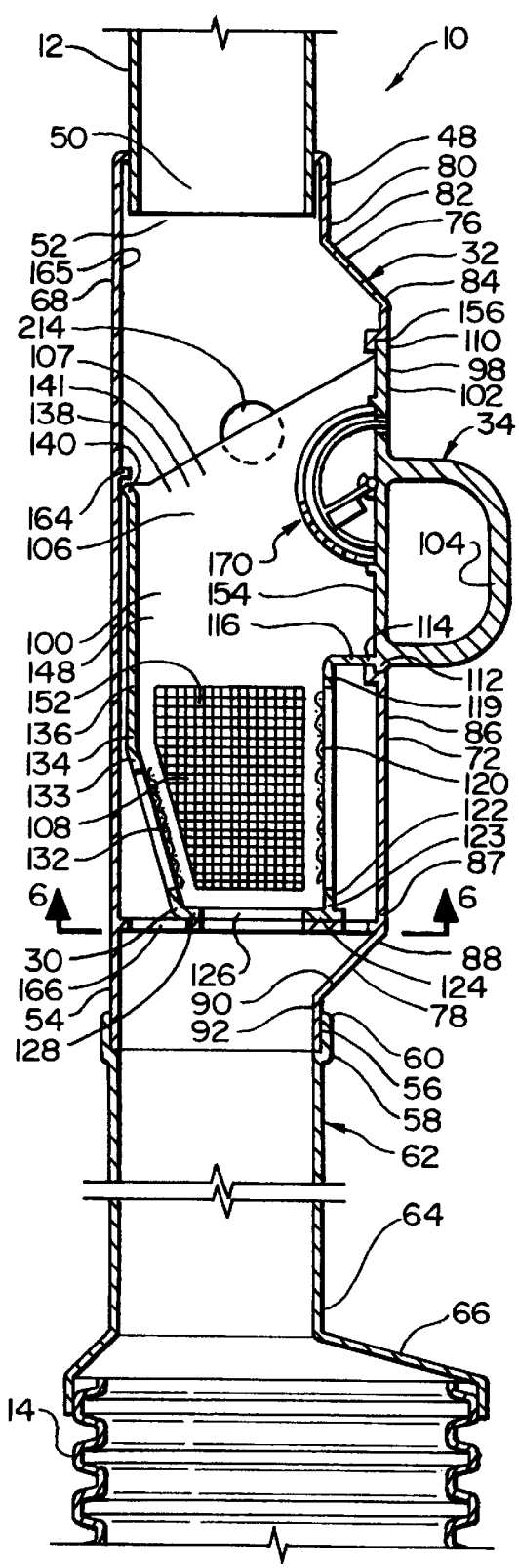

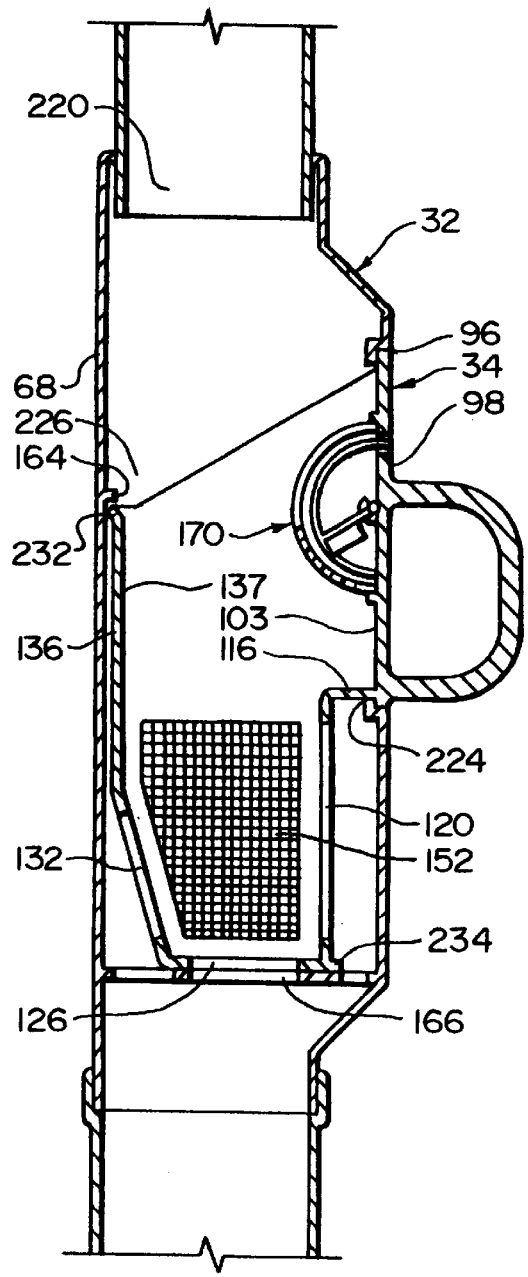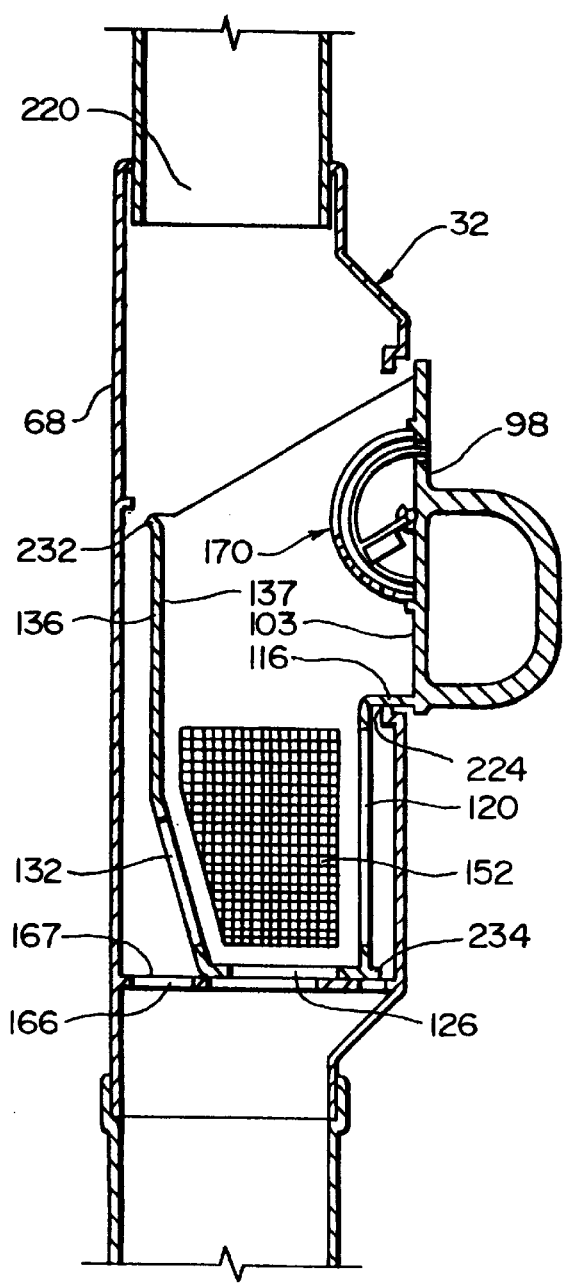

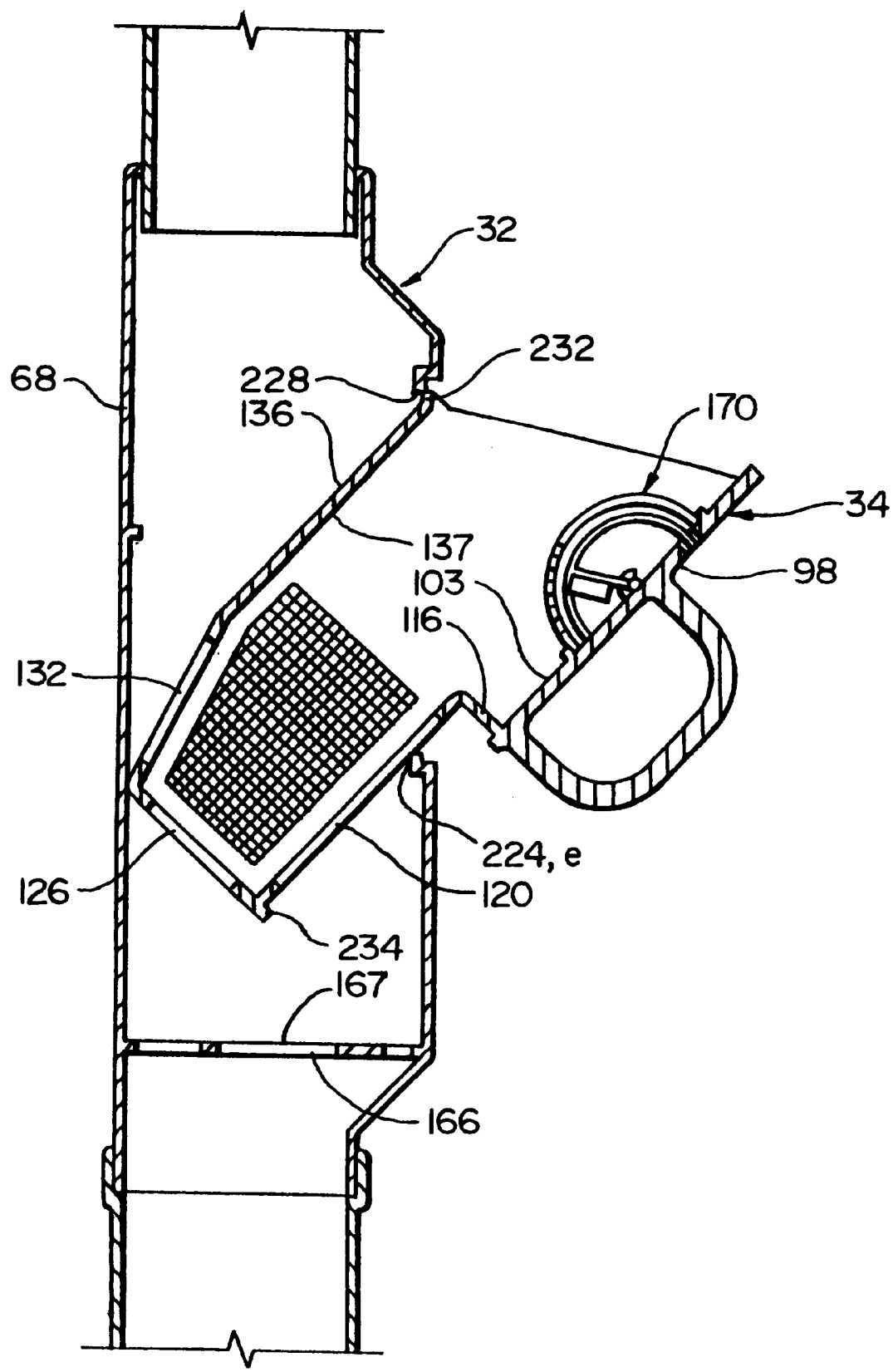

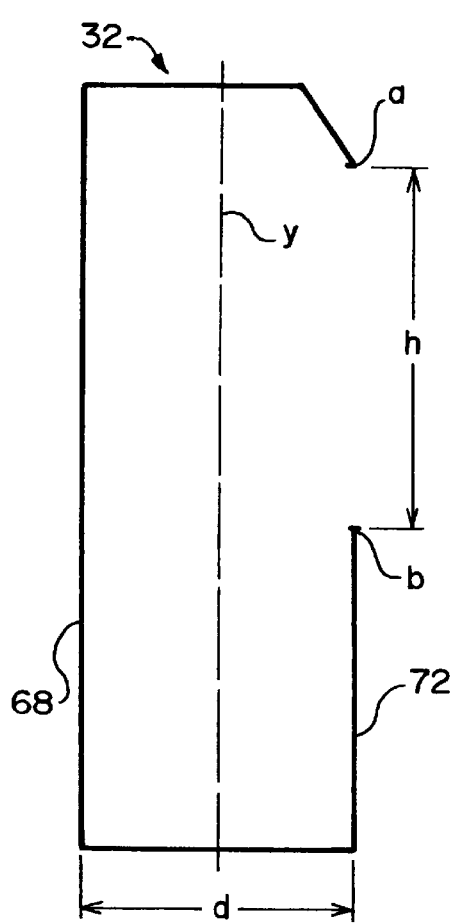
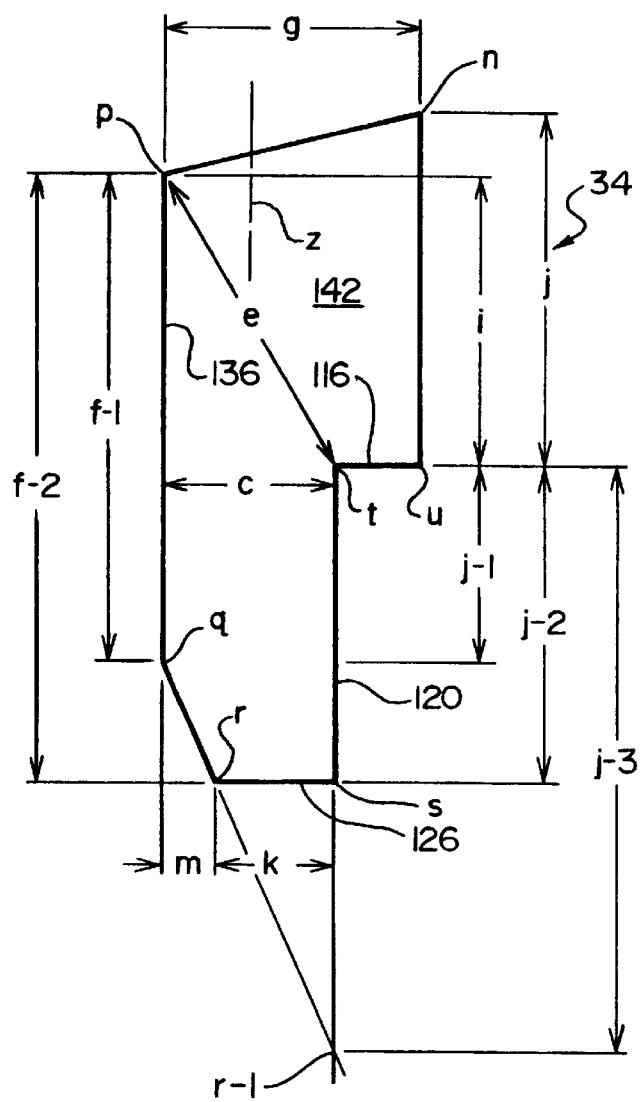

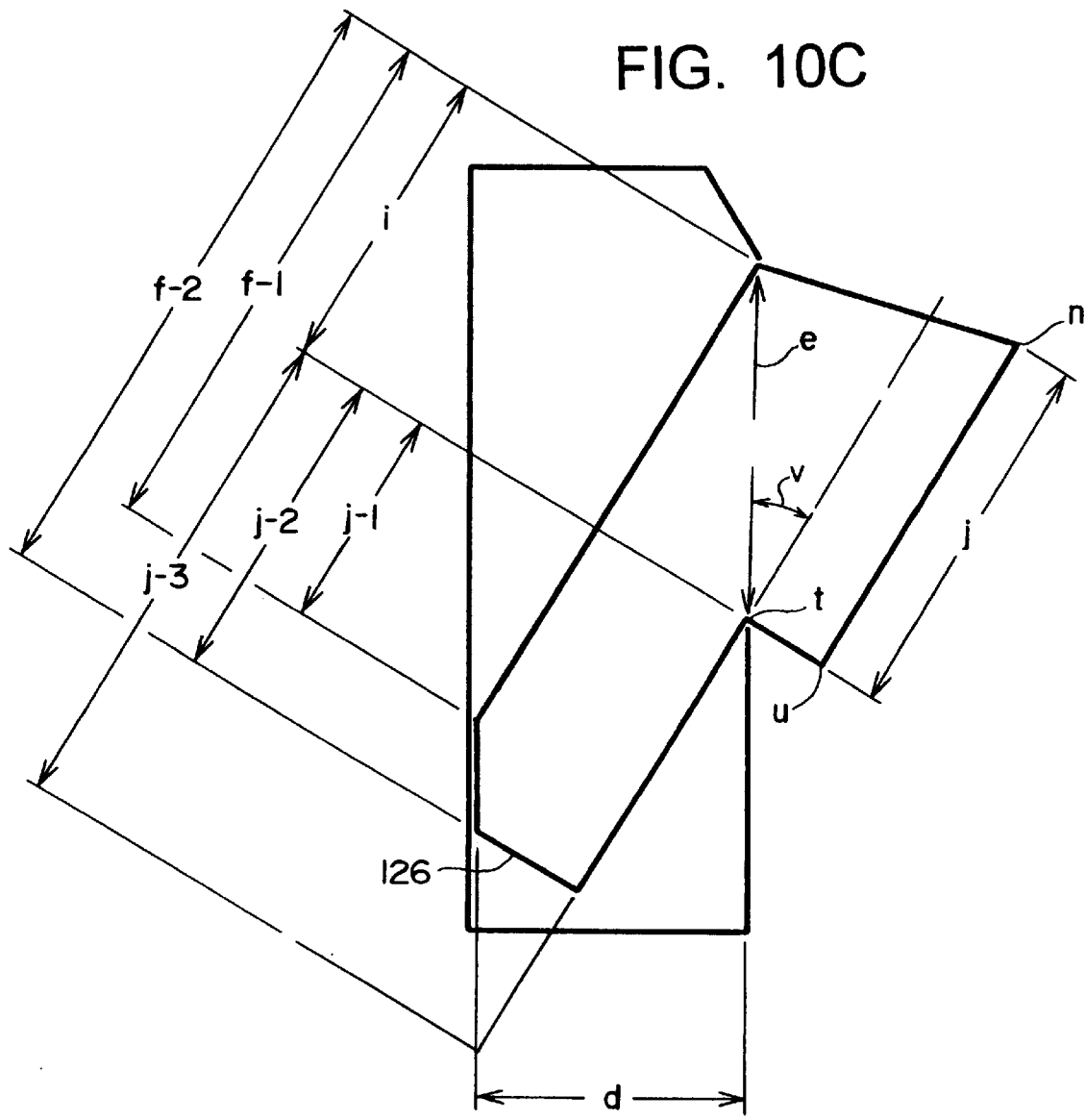

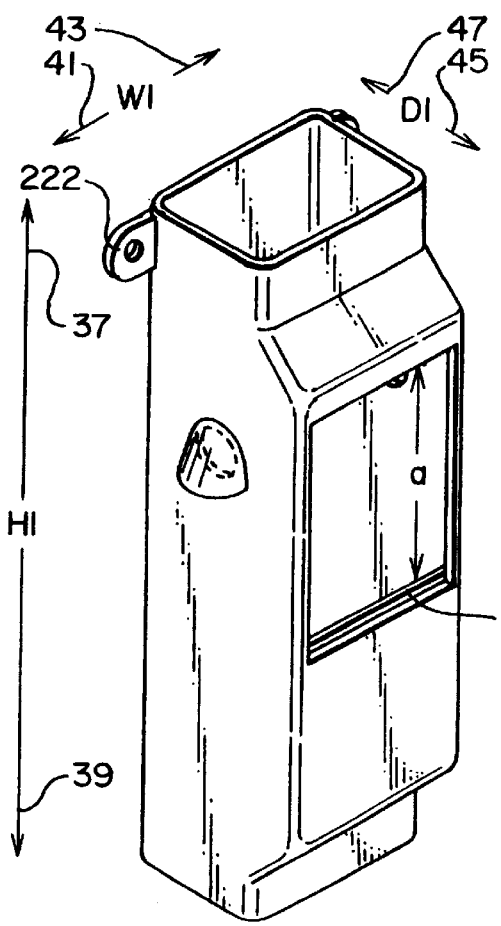
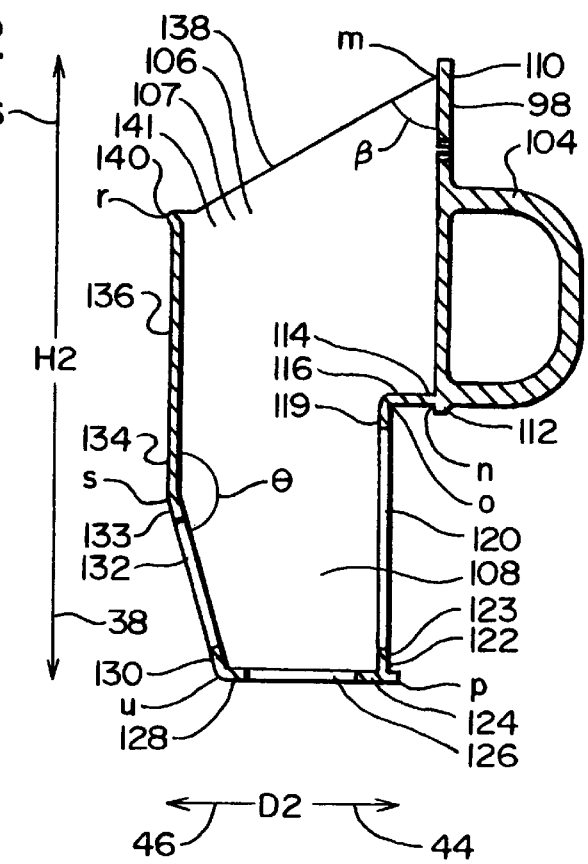
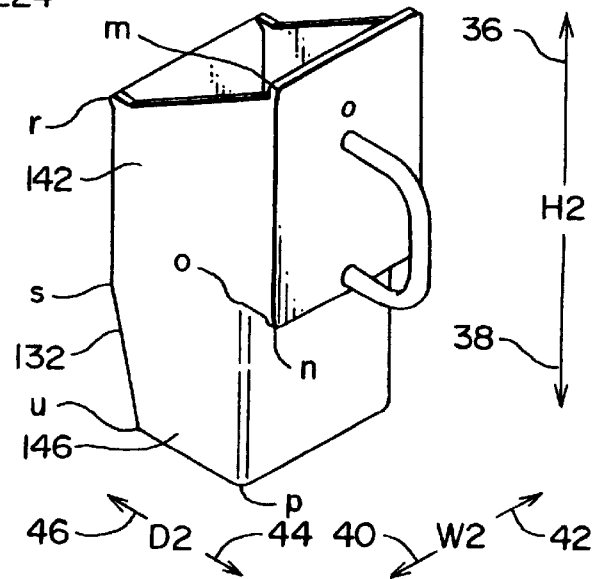

REMOVABLE DOWNSPOUT DEBRIS TRAP ASSEMBLY

BACKGROUND OF THE INVENTION

1. Field of the Invention

This invention relates generally to the field of rain gutters and downspouts. In particular, the present invention is a debris trap assembly that is installed in place of the lower portion of a downspout from about waist height to near ground level. The debris trap comprises a strainer cup that can be conveniently emptied at any time by removing the strainer cup, dumping the debris accumulated in the strainer cup into the trash or compost bin, and then replacing the strainer cup in the debris trap assembly.

2. Background Art

Around the turn of the twentieth century, strainers were placed in rain water spouts to trap debris before it reached a rain water barrel or cistern. U.S. Pat. No. 527,400 (Barth) teaches a strainer of this type. In Barth, a cut-off box with an open front wall panel and a closed back wall panel is taught. A "V" shaped strainer is placed through the open front wall panel and tipped back so that it top edge rests against the back wall panel. The strainer's base is held in place by a bracket attached to the lower front end of the cut-off box. When the strainer is inserted, the user pulls up a handle that lifts a hinged flap. The flap is lowered into the strainer to secure the strainer in position. In this first operating position, the interior of the strainer extends beyond the cut-off box, exposing the debris to view. The strainer has a second operating position that deflects the rain water and debris out through the open portion of the cut-off box and away from the cistern. This involves removing the strainer, pulling a hinged diverter flap from the back of the cut-off box, and placing the strainer inside the cut-off box so that the diverter flap rests on top of the strainer.

Several other patents have described in-line filters and strainers for rain water downspouts. These mostly comprise an in-line box with a hinged door and an internal strainer. The strainer is cleaned by opening the door, manually removing the debris, and then closing the door. Examples of this type of configuration are found in U.S. Pat. No. 543,922 (Buckley), U.S. Pat. No. 2,887,073 (Thompson), and U.S. Pat. No. 4,183,368 (Husted).

There have also been several variations on this basic concept. For instance, in U.S. Pat. No. 1,076,075 (Steel), a strainer is connected to a door that is attached by a hinge to an in-line box. To empty the strainer, the user pivots the door and the attached strainer about the hinge until the strainer is inverted. In U.S. Pat. No. 1,653,473 (Schulz), the strainer is mounted inside the in-line box so that it is inclined toward a door that is hinged at the top. The debris is supposed to slide down the screen, open the hinged door, and fall away. U.S. Pat. No. 4,801,377 (Bolt), uses the same basic concept, but omits the hinged door.

U.S. Pat. No. 4,798,028 (Pinion) eliminates the in-line box by adapting the strainer to telescopically mount over the base of the downspout. In its operating position, a top portion of the strainer is mounted over a lower end of a downspout. A lower portion of the strainer fits inside the drain tile. To disengage the strainer, the strainer is pulled up over the downspout until the lower portion of the strainer is clear of the drain tile. The lower portion of the strainer is then titled away from the drain tile while the top portion is telescoped down and away from the downspout.

SUMMARY OF THE INVENTION

One of the unfortunate chores associated with building maintenance is cleaning out the debris that accumulates in the rain gutters. This debris is usually comprised of a decomposing mixture of pine needles, leaves, insects and other organic matter. Leaving this material to accumulate in the rain gutters and downspouts can lead to a number of problems, the most obvious being that the rain gutter system will no longer function to carry the rain water away from the building. When the rain gutters overflow, the rain water is deposited right next to the building where it can flood basements, weaken foundations, and destroy landscaping.

While the chore of cleaning rain gutters is sometimes absolutely necessary, it can be unpleasant and potentially dangerous. The chore is unpleasant because of the smell and texture of the decomposing debris. Also, unfortunately, rain gutters tend to fill with debris mostly during the fall and winter seasons when the trees drop their leaves. Most rain gutters are mounted just below the roofline, which is usually at least eight feet from ground level. To clean the gutters, the homeowner will usually climb a ladder and reach from side to side scooping debris from rain gutter. The danger of falling from the ladder while off balance reaching from side to side is apparent.

Debris also travels down the downspout and into the drain tile. A downspout is normally comprised of an elongated tubular section running vertically from the rain gutter to the drain tile. The drain tile is normally a large perforated pipe that is buried in a bed of gravel that circles the perimeter of the building. Removing the debris that accumulates and clogs downspouts and drain tile is very difficult and often quite expensive. For instance, a clogged downspout might be unblocked by forcing a plumber's snake down it from its top end (from a ladder eight or more feet up), but when the clog is freed, the debris will flow into the drain tile. Alternatively, the downspout can be removed from the building, flushed, and then reinstalled. Clogged drain tile would probably have to be removed and replaced—a very expensive procedure.

The removable rain gutter debris trap assembly of the present invention is comprised of a strainer housing, a removable strainer cup, a clean-out indicator means, overflow drains, an extension section and a series of adapter collars for interfacing the removable debris trap assembly with a downspout and a drain tile system.

The debris trap assembly of the present invention comprises a housing and a debris collecting container removably positioned within the housing.

The housing has an upper end with an upper inlet opening to receive the rain water and debris from the down spout. There is a lower end having a lower discharge opening to discharge the rain water, and also an intermediate section located between the upper and lower ends, comprising wall means defining a collecting region. The wall means comprises a front and rear vertical walls spaced from one another by a predetermined depth dimension "d";

The housing has a vertical axis "y" extending from the lower end to the upper end.

The front wall has a front access opening having an upper edge "a" and a lower edge "b" defining a height dimension "e".

The debris collecting container is adapted to be removably mounted in the containing region of the housing at a collecting location, and it also defines a debris containing chamber. The container comprises a front wall, a rear wall, side walls and a bottom wall.

The container has an upper containing portion which in the collecting location is positioned at a level of said upper access opening, and an upper inlet portion to receive the rain water and the debris. The upper containing portion has an upper front wall portion and a rear upper wall portion.

The container has a lower containing portion which, in the collecting location, is positioned to a level to extend below the access opening. The lower containing portion has a lower front wall portion of said front wall and a lower rear wall portion of said rear wall.

The container has screen means at least over a portion of the container walls to contain debris and permit rain water to flow therethrough.

The container has a collecting position where the contacter in the collecting position is positioned with an upper inlet portion positioned and aligned to receive the rain water and debris.

The container also has a pre-removal position where at least an upper end of the lower front wall is moved forwardly to be adjacent to the lower end "b" at the access opening, and the forward portion of the upper containing portion is moved at least partially through the access opening. Also, to arrive at the preremoval position, the container is rotated about the lower edge "b" at the access opening so that a lower end portion of the containing portion is adjacent to the rear wall of the housing so that the rear wall of the container is aligned relative to the upper edge at the access opening. This is done in a manner that the rear wall of the container and the front lower wall portion are aligned with the access opening so that the container can be moved with a linear component of travel through the access opening so as to be able to be emptied of debris, and then reinserted to its collecting location.

The lower containing portion has a front to rear depth dimension "c" at an upper portion of said lower containing portion that is less than the depth dimension "d" so that with the upper front wall portion of the lower containing portion being positioned adjacent to the front wall of the housing, and with the lower rear portion of the lower containing portion being spaced from the rear wall of the housing, the container can be rotated to the pre-removal position where the lower rear end of the container is adjacent to the rear wall of the housing.

There is an upwardly extending maximum removal dimension "e" extending from the upper end of the lower forward wall portion of the lower container portion to the upper edge location of the upper containing portion. This dimension "e" is no greater than the height dimension "h" of the access opening.

Also, the container has a first lower clearance dimension "f" (1) that extends from the upper end of the rear wall of the container to a lower location of the rear wall of the container that is no greater than a value equal to $$\frac{(d)(h)}{c}$$

The upper front wall portion of the upper containing portion is, with the container in the collecting position, positioned over the front access opening. The housing and the container have interfitting lip means to retain the front wall of the containing portion with the container in the collecting location, so that the front wall covers the access opening.

The upper front wall portion of the container is positioned at a more forward location relative to the lower front wall portion of the container, and there is a transition wall portion having a horizontal alignment component and interconnecting a lower edge of the front wall portion and an upper edge of the lower front wall portion of the container.

In the preferred form, the upper and lower rear wall portions of the container are substantially aligned with one another. In the collecting location these are positioned adjacent to the rear wall of the housing, and in the pre-removal position the rear wall of the container is slanted upwardly and forwardly toward the upper edge "a" of the front access opening. Also, in a preferred configuration, a lower rear portion of the lower containing portion has a lower rear slanted wall portion having a downward and forward slant, whereby with the container in the pre-removal position, the lower rear wall portion is positioned adjacent to the rear wall of the housing.

There is also an overflow opening in the housing at an upper location of the containing region to permit excess rain water to flow outwardly from the housing.

Also, there is a flow indicator means positioned to indicate a predetermined level of rain water in the container. In a preferred form, there is a float means which is connected to an indicator, in a manner that upward movement of the float means causes the indicator to move outwardly to an indicating position. Desirably, the float means and the indicator are pivotally mounted to the upper front wall portion of the container.

In the method of the present invention, the assembly is provided, as indicated above, with the container in its operating position to receive the rain water and debris flowing down a rain spout, the upper end opening of the container is aligned to receive the rain water and debris. Further, the upper front wall of the container covers the access opening.

To remove the container from the housing, the container is moved forwardly in a manner that at least an upper end portion of the lower portion of the front wall is adjacent to the lower edge of the access opening. The container is also moved rotatably so that the lower part of the rear portion of the container is adjacent to the rear wall of the housing. This properly aligns the container to its pre-removal location. Then the container is moved through the access opening with a linear component of travel. Also, in the preferred form, the container can be moved with a rotational component of movement to be removed from the housing.

After the debris is emptied, then the container can be reinserted into the housing, by moving the container along a path which is the reverse of the path that the container travels when it is being removed.

Other features of the present invention will become apparent from the following detailed description.

BRIEF DESCRIPTION OF THE DRAWINGS

FIG. 3 is a front elevational view of the present invention.

FIG. 4 is a cross section view of the present invention taken along line 4—4 in FIG. 3.

FIGS. 5a–5g are a series of partial cross-sectional views of the present invention taken along line 4—4 in FIG. 3 and illustrating the steps involved in removing the strainer cup from the housing.

FIG. 12 is a cross-sectional view of the strainer cup.

FIGS. 13(a–b) are isometric views of the strainer housing and strainer cup, respectively.

Figure 1:
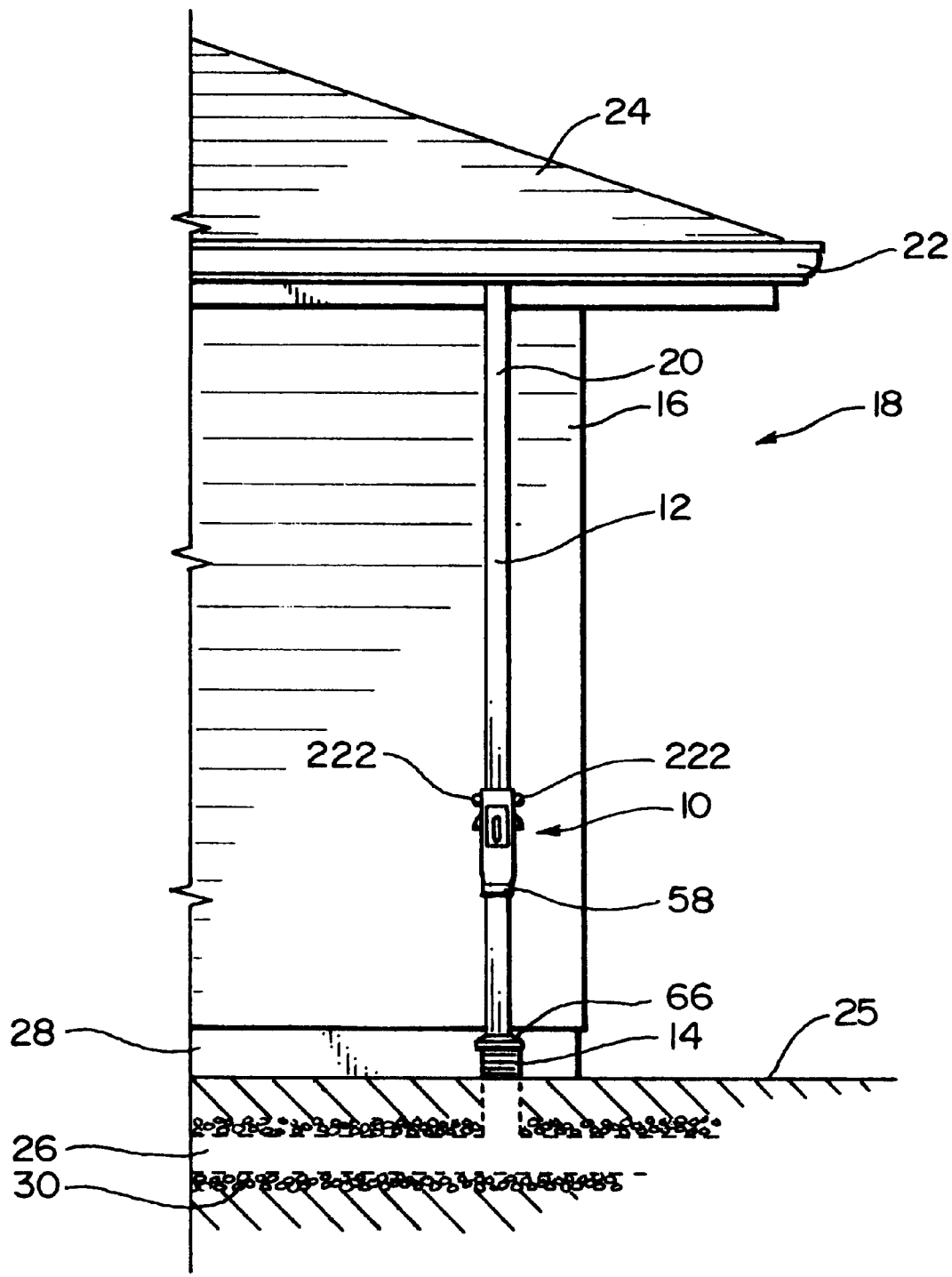
FIG. 1 is a side elevational view showing a preferred embodiment of the present invention installed on the side of a building and joining the lower portion of a downspout to a drain tile pipe.

Appendix 1 is a listing of program written in MICROSOFT VISUAL BASIC for designing the strainer cup in accordance with the method described herein.

Unless otherwise noted, if the same reference numeral is used in a one or more of the Figures, that reference character refers to an items that is the same or equivalent to that shown in the other Figures. A letter suffix appended to a reference numeral is used to indicate the item as used in a specific embodiment. Letter designations used to refer to geometric points and line segments will differ, depending upon the Figures to which reference is made.

DESCRIPTION OF THE PREFERRED EMBODIMENTS

In FIG. 1, a debris trap assembly 10 is installed between a downspout 12 and a drain tile 14 on an exterior wall 16 of a building 18. The downspout 12 is connected at a top end 20 to a rain gutter 22. The rain gutter 22 is usually mounted just below the roof 24 of the building 18 where it catches the rain water that falls from the roof 24. On a typical single story building 18, the height of the rain gutter 22 will usually be about eight feet from the ground 25.

During inclement weather, the downspout 12 conducts rain water and debris from the rain gutter 22 to the drain tile 14. The drain tile 14 usually comprises an extended perforated pipe 26 that is buried along the perimeter of the building 18 along its foundation 28 in a gravel-filled channel 30. The drain tile 14 channels the rain water from the downspout 12, and from the gravel-filled channel 30, away from the foundation 28, where it is usually emptied into a municipal storm drain system.

Figure 2:
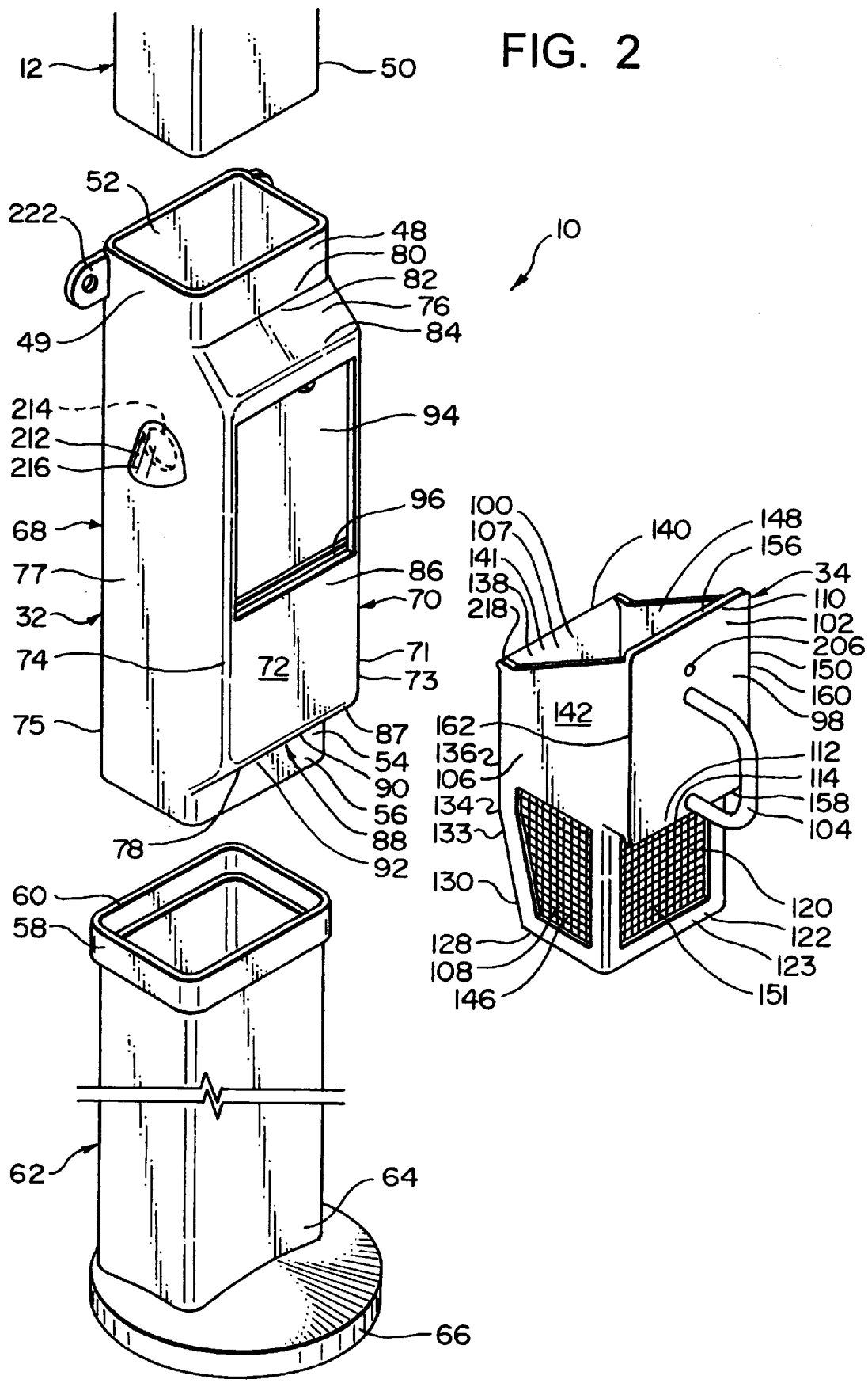
FIG. 2 is an exploded side elevational view of the present invention.

FIG. 2 shows an exploded view of the debris trap assembly 10. The strainer trap assembly 10 comprises a strainer housing 32 into which a strainer cup 34 is placed. The method of placing the strainer cup 34 into the strainer housing 32 is an integral part of this invention and is discussed below in conjunction with the explanation of FIG. 5(a–g). Another important part of this invention is the design of the strainer cup 34.

For convenience of description, the strainer housing 32 has a height axis (H1; FIG. 13a) with an top (or upper) end 37 and a bottom (or lower) end 39; a width axis (W1; FIG. 13a) with a left side 41 and a right side 43; and, a depth axis (D1; FIG. 13a) with a forward end 45 and a rearward end 47. Similarly, the strainer cup 34 has a height axis (H2; FIG. 12) with an top (or upper) end 36 and a bottom (or lower) end 38 ; a width axis (W2; FIG. 13b) with a left side 40 and a right side 42; and, a depth axis (D2; FIGS. 12, 13b) with a forward end 44 and a rearward end 46. The descriptions of upper, top, lower, bottom, left, right, front, rear and similar terms discussed below are made with reference to these axes.

Referring to FIG. 2, the strainer housing 32 has an upper collar adapter 48 that is preferably integrally formed at the top 49 of the strainer housing 32. The upper collar adapter 48 is dimensioned to telescopically accommodate a lower portion 50 of the downspout 12. As is shown in FIG. 4, it is desirable to have a reasonably close fit between the lower portion 50 of downspout 12 and an interior surface 52 of the upper collar adapter 48 to facilitate a stable installation and to avoid rain water leakage. Of course, the upper collar adapter 48 of the strainer housing 32 can be molded to fit any shape downspout 12. For instance, the upper collar adapter 48 could just as easily be molded to comprise a circular shape rather than the rectangular configuration shown in the Figures.

Returning to FIG. 2, a lower adapter 54 of the strainer housing 32 is dimensioned so that an exterior surface 56 snugly fits into an adapter collar 58 formed from the top end 60 of an extension member 62. A lower end 64 of the extension member 62 is attached to a drain tile adapter 66 that connects to the drain tile 14. The connection of the drain tile adapter 66 to the drain tile 14 is best seen in FIG. 3.

The strainer housing 32 is designed to cooperate with the strainer cup 34 so that the strainer cup 34 can occupy nearly the entire volume of the strainer housing 32 while remaining removable therefrom. The design of the strainer cup 34 that makes this possible is comprised of a planar rear wall 68 that is parallel to the height axis (H2) and to the width axis (W2). A planar right side wall 70 parallel to the height axis (H2) and to the depth axis (D2) is joined perpendicularly to the right side 69 of the rear wall 68 and extends forwardly. The forward edge 71 of the right side wall 70 perpendicularly joins a right side 73 of a front wall portion 72. The front wall portion 72 is generally parallel to the height axis (H2) and the width axis (W2) but is specially configured as is described below. At a left side 74 of the front wall portion 72, a planar left side wall 77 is joined that is parallel to the height axis (H2) and the depth axis (D2) and that extends rearwardly until it perpendicularly joins a left side 75 of the rear wall panel 68.

The cross-sectional area of the strainer housing 32 is somewhat larger that the cross-sectional area of the downspout 12. The position of the front panel portion 52 is designed to increase the volume of the strainer housing 32 and to cooperate with the design of the strainer cup 34 as is discussed below. To accomplish this, the front wall panel portion 72 is extended forwardly by using a slanted upper protrusion wall 76 and a corresponding lower protrusion wall 78.

From the top of the housing 32 downward, a lower end 80 of the upper collar adapter 48 is joined to a rear end 82 of the upper protrusion wall 76. The upper protrusion wall 76 slants from the upper collar adapter 48 downwardly and forwardly where its lower end 84 joins a front wall panel 72 that is parallel to the height (H2) and width axes (W2). A lower end 87 of the front wall panel 86 is joined to a top end 88 of the lower protrusion wall 78 that is directed downwardly and rearwardly where its lower portion 90 joins an upper portion 92 of a lower strainer housing adapter 54.

The front wall panel 72 of the strainer housing 32 defines an access opening 94 through which the strainer cup 34 is placed in the strainer housing 32. A circumferential channel 96 surrounding the access opening 94 is also defined in the strainer housing 32 into which a front wall panel 98 of the strainer cup 34 is designed to fit. When the strainer cup 34 is in its operating position the contact between the strainer cup's 34 front wall panel 98 and the circumferential channel 96 forms a water resistant seal.

In addition to the functional features of the strainer cup 34 described herein, the placement of the strainer cup 34 in the strainer housing 32 serves the aesthetic purpose of keeping the accumulated debris out of sight. Other than the relatively small access opening 94 through which the strainer cup 34 is inserted and removed, the remainder of the strainer housing 32 is enclosed and will keep the debris from sight. Even though the strainer cup 34 is designed to occupy the most volume possible within the strainer housing 32, it is also designed to be easily inserted and removed from this relatively small access opening 94. This is accomplished by the novel shape of the strainer cup 34, the detailed design of which is discussed below.

The strainer cup 34 has eight planar walls that define an interior portion 100 that has an upper debris/rain water receiving area 106 and a lower strainer basket portion 108. Together, these upper 106 and lower 108 portions form a strainer cup 34 of a unique and highly functional shape. A handle 104 is attached to the forward surface 102 of the front wall panel 98 of the strainer cup 34. The cross-sectional view of the strainer cup 34 in FIG. 12 best shows this unique shape. The upper debris/rain water receiving area 106 has an open top 107 to receive the debris/rain water mixture. The lower strainer basket 108 has four perforated mesh sides 120, 132, 146, 152 and a perforated mesh bottom 126 that traps the debris while allowing the rain water to flow through to the extension member 62 and then to the drain tile 14.

Specifically, the front wall panel 98 of the strainer cup 34 is parallel to the height axis (H1) and the width axis (W1) and has a free top end 110 and a bottom end 112 that is joined to a forward end 114 of a transition wall 116. This top edge 110 is the highest point on the strainer cup 34 relative to the axes defined in the FIGS. 12–13. The transition wall 116 is parallel to the depth axis (D1) and the width axis (W1) and extends perpendicularly from the bottom end 122 of the front wall panel 98 rearwardly until its rear end joins the top end 119 of a lower front mesh wall 120. The lower front mesh wall 120 then extends perpendicularly downwardly where its bottom end 123 joins the front end 124 of a mesh bottom 126. The mesh bottom wall 126 is parallel to the width axis (W1) and the depth axis (D1) and extends perpendicularly from the lower front wall 120.

A rear end 128 of the mesh bottom wall 126 is joined to a bottom end 130 of a slanted mesh wall 132 that extends rearwardly and upwardly toward the top end 110 of the strainer cup 34 where it's top end 133 joins the bottom end 134 of the rear wall panel 136. The rear wall panel 136 extends upwardly from the slanted mesh wall 132 and is parallel to the height axis (H1) and the width axis (W1). A plane 138 defined by the top edge 110 of the front wall panel 98 and the top edge 140 of the rear wall panel 136 slopes downwardly and rearwardly and represents the open top end 141 of the strainer cup 34. The slope of this plane 138 or more specifically, the relative positions of the top edge 140 of the rear wall panel 136 and the top edge 110 of the front wall panel 98 are important to the operability of the invention. The reason for this is explained below in detail during the discussion of the design criterion for the strainer cup 34.

The left side wall 142 of the strainer cup 34 is parallel to the height axis (H2) and the depth axis (D2) and is joined perpendicularly to the left sides of the front wall panel 98, the transition wall 116, the lower front mesh wall 120, the bottom mesh wall 126, the slanted mesh wall 132, and the rear wall panel 136. The lower portion 146 of the left side wall 142 has a mesh area 146 (FIG. 2). The right side wall 148 is a mirror image of the left side wall 142, and is similarly perpendicularly joined to the right sides 150 of the front wall panel 98, the transition wall 116, the lower front mesh wall 120, the bottom mesh wall 126, the slanted mesh wall 132, and the rear wall panel 136 so that it is also parallel to the height axis (H2) and the depth axis (D2). The right side wall 148 also has a lower mesh portion 152. When looked at in combination, the five mesh walls 120, 126, 132, 146, 152 form a strainer basket 108 that will retain debris while allowing rain water to pass through the perforations 151 comprising the mesh strainer basket 108 to the extension member 62 and then to the drain tile 14.

When in the strainer cup 34 is in its operating position (FIGS. 3–5a), the rearward side 154 of the top 156, bottom 158, right side 160 and left side 162 edges of it's front wall panel 98 lie within the circumferential channel 96 surrounding the access opening 94. Gravity tends to rotate the strainer cup 34 rearwardly into the housing 32 about pivot point 224. The rear wall portion 136 of the strainer cup 34 rests against the rear wall panel 68 of the strainer housing 32 with the top edge 140 of the strainer cup's 34 rear wall panel 136 aligned under a tang 164 positioned on the forward surface 165 of the rear wall portion 68 of the strainer housing 32. The bottom mesh wall 126 of the strainer cup 34 rests on a platform 166. The platform 166 is shown from above in FIG. 6 and has several water transmitting openings 168. Of course, the platform 166 could have an integrally formed mesh area like those found in the lower walls 120, 126, 132, 146, 152 of strainer cup 34, to further protect drain tile 14 against falling debris when the strainer cup 34 is removed for cleaning.

Figure 7:
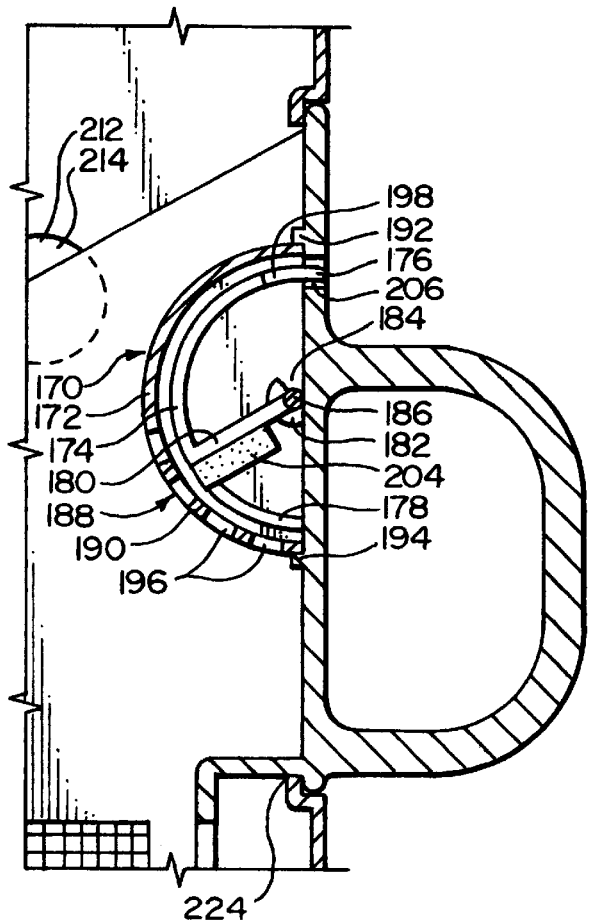
FIG. 7 is a cross-section view of the strainer cup assembly illustrating the clean out indicator means in the down position, indicating that clean out is not required.
Figure 8:
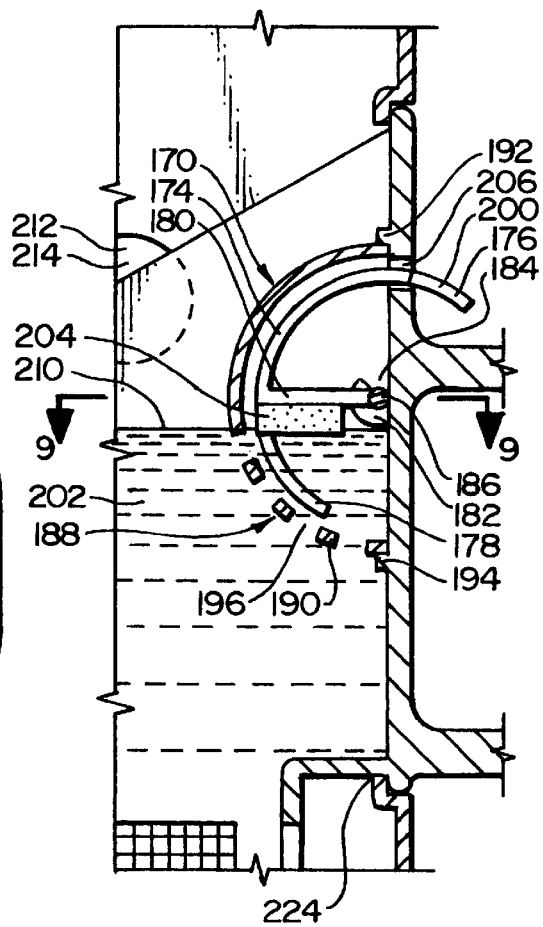
FIG. 8 is a cross-section view of the strainer cup assembly illustrating the clean out indicator means in the outward and extended position, indicating that clean out is required.
Figure 9:
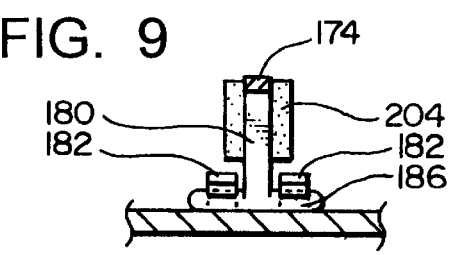
FIG. 9 is a cross-section view taken along line 9—9 of FIG. 8 and illustrating the preferred method of mounting the indicator means to the housing assembly.

The preferred embodiment of the invention has an indicator assembly 170 incorporated into the strainer cup 34 that warns the building 18 owner that the strainer cup 34 is full of debris. The indicator assembly 170 is shown in FIGS. 7–9 and is comprised generally of an indicator housing 172 and a rotatably mounted indicator 174. The indicator 174 has a semi-circular shape with a brightly colored indicator end 176 and a stop end 178. A support member 180 extends as a radius from the indicator 174 for pivotal attachment to the front wall panel 98 of the strainer cup 34 by semi-circular brackets 182. The semi-circular brackets 182 are preferably integrally formed with the front wall panel 98 and have an open top end 184, so that the indicator 174 can be snapped into brackets 182 when the strainer cup 34 is assembled. The mounting of the indicator 174 is shown in FIG. 9. The support member 180 has an end connected to a pivot bar 186 that is perpendicular to support member 180. During assembly, the pivot bar 186 is snapped into the brackets 182 so that the indicator 174 can freely pivot about the pivot bar 186. The indicator housing 172 has a mesh water inlet 188 integrally formed from its lower portion 190. The indicator housing 172 snaps into position on the front wall panel 98 after the indicator 174 has been snapped into the brackets 182 and is held in position by a top mounting member 192 and a bottom mounting member 194. The mesh water inlet 188 forms water inlet holes 196 that are large enough to permit the introduction of water 202, but are also small enough that debris will not enter the indicator housing 172 and obstruct the indicator 174.

The indicator 174 has a non-indicating position 198 shown in FIG. 7, and an indicating position 200 shown in FIG. 8. The indicator 174 is moved from the non-indicating position 198 to the indicating position 200 by a float 204 that is attached to the underside of support member 180. As water 202 enters indicator housing 172, it will cause the float 204 to push the support member 180 upwardly into the indicating position 200. In the non-indicating operating position 198, the indicator end 176 is retracted into an indicator hole 206 that is formed in the front wall panel 98 of the strainer cup 34. The stop end 178 of the indicator 174 rests against the front wall panel 98 because there is no water 202 in the indicator housing 172 to push the float 204 upward. In this position, the stop end 178 keeps the indicator end 176 properly positioned in the indicator hole 206.

In the indicating position 200 shown in FIG. 8, water 202 has accumulated in strainer cup 34 and has entered the indicator housing 172 through the mesh inlet 188. The rising water level 210 pushes the float 204 and therefore, the entire indicator 174 upwardly. This causes the indicator 174 to pivot about pivot bar 186 and forces the indicator end 176 out through indicator hole 206 so that the indicator end 176 projects from the front wall panel 98 of the strainer cup 34. The indicator end 176 is preferably colored in a highly visible color, such as red, that contrasts with the color of the remainder of the debris trap assembly 10. This signals the user that the strainer cup 34 needs to be emptied.

Returning to FIG. 3, the preferred embodiment of the invention has two emergency drains 212, with one emergency drain 212 located on the right side wall 70 of the housing 32, and the other emergency drain 212 located on the left side wall 74 of the strainer housing 32. The emergency drain 212 is comprised of a drain hole 214 (FIG. 4) that is formed in each of the side wall panels 70, 74. A funneling cover 216 is attached, or integrally formed, on the panels 70, 74 and covers the drain holes 214. Each funneling cover 216 directs any water flow coming through the drain holes 214 toward the ground 25 and away from the building 18. If the strainer cup 34 fills with so much debris that it no longer conducts water to the drain tile 14, the rain water will begin to flow out the emergency drains 212, keeping the downspout 12 from backing up and not emptying the rain gutters 22. Since water will only flow from the emergency drains 212 when the strainer cup 34 is full and the indicator 174 has long since extended, the emergency drains 212 serve as additional (and perhaps more urgent) indication that the strainer cup 34 need to be emptied.

One of the advantages of the present invention is that the housing 32 and the strainer cup 34 are arranged so that the dimensions can be optimized to provide a proper balance between the capacity of the cup to retain debris (relative to the overall dimension of the housing) and yet provide for its convenient operation. There are a number of mathematical relationships which can be examined to define the critical dimensions and relationships of the various components or portions of the housing 32 and strainer cup 34, as a means of analyzing how these relative dimensions can be optimized. Some of these relationships can be expressed in geometric, trigonometric, and/or algebraic terms. In the following text, a number of approaches will be examined.

Figure 10D:
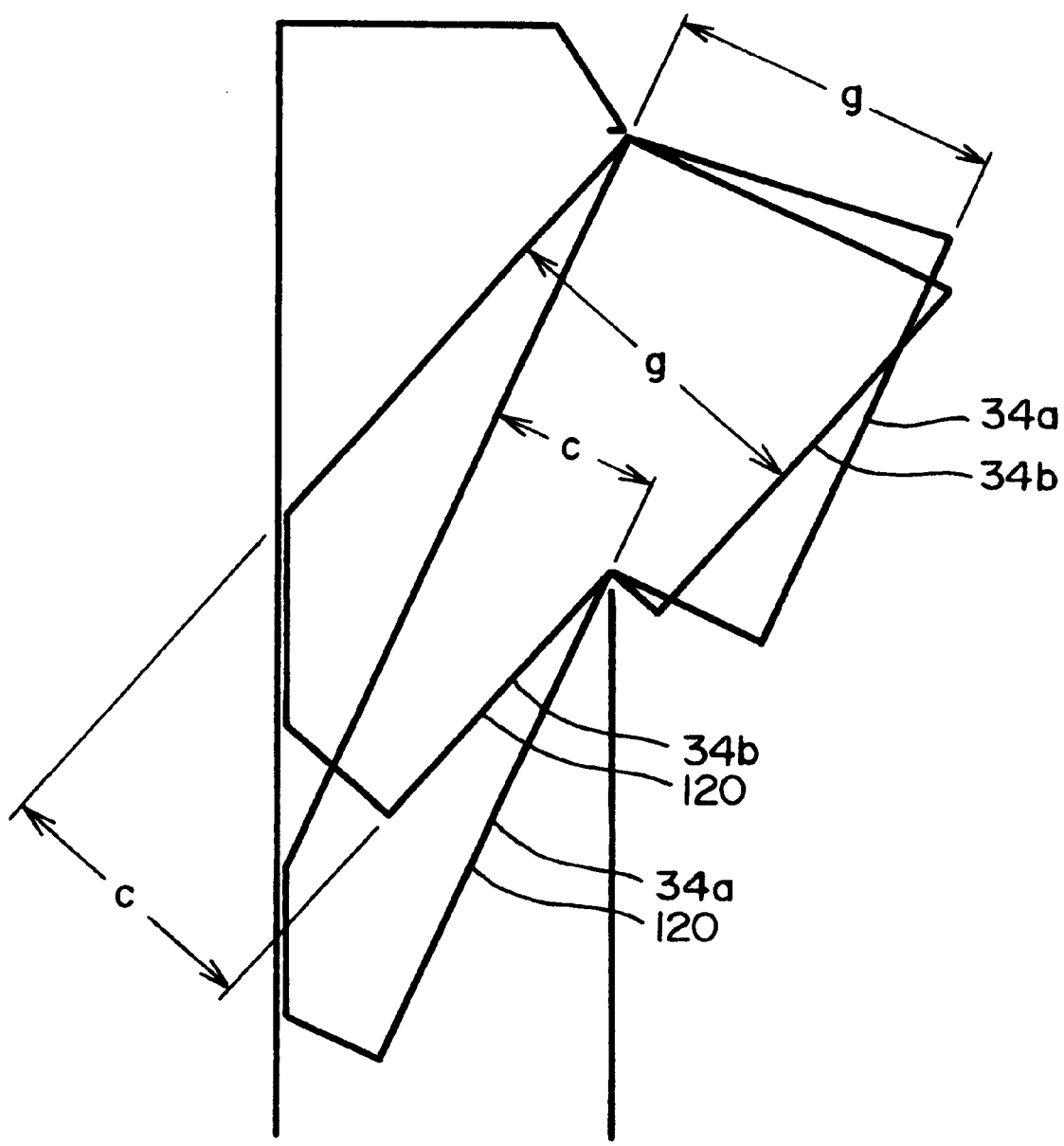
FIGS. 10(a–h) are a series of schematic drawings illustrating the method of designing the strainer cup.

Reference will first be made to FIGS. 10A, 10B, 10C and 10D. These Figures are somewhat schematic. FIG. 10A shows the housing by itself, and FIG. 10B shows the strainer cup by itself FIG. 10C shows the strainer cup in its escape position where it can be either moved out of the housing or be placed back into the housing in its operating position.

FIG. 10D illustrates two possible configurations of the strainer cup, one where the depth dimension of the lower strainer cup portion 108 has a greater front to rear depth, but a shorter height dimension, and another where the front to rear depth is less, with a greater height dimension.

In FIGS. 10A and 10B, the letters "a" and "b" show the upper and lower edges of the access opening 94 of the housing 32. The letters "c" through "k", and also the letter "m" indicate various dimensions of the housing 32 and strainer cup 34. The letter designations "n" and "p" through "u" indicate various edge locations on the strainer cup.

In FIG. 10A, there is shown the housing 32 separately, having a vertical axis "y". For convenience of manufacture, and also providing the greatest retaining volume relative to its overall dimensions, this housing 32 has the configuration of a rectangular prism (i.e. a box like configuration). There are two critical dimensions to be considered, relative to the housing 32, namely first the height (designated as "h" in FIG. 10A) of the front access opening 94, measured from the edge locations "a" and "b" and the depth dimension (designated d in FIG. 10A) which is the distance between the front and rear wall 68 and 72 of the housing 32.

There are a number of critical dimensions relative to the strainer cup 34, and, with reference to FIG. 10B, these will be listed below:

a. There is the depth dimension "c" between the front wall 120 and rear wall 136 of the lower section 108 of the strainer cup 34, this dimension "c" being particularly critical with respect to the depth dimension "d" of the housing 32;

b. there is the upper clearance dimension "e" from the edge "t" at the rear end of the transition wall 116 and at the top edge of the lower front wall 120, to the edge line p at the top of the rear panel 136, which is also the juncture point of the upper edge of the side walls, one of which is indicated at 142;

c. there is a first lower rear clearance dimension "f-1" which is the height dimension from the edge "t" to the height lower edge "q" of the rear panel 136;

d. there is the second lower rear clearance dimension "f-2" which the height dimension from the edge location "t" to the height of the edge location "r" at the rear end of the lower wall or panel 126;

e. finally there is the height dimension "j" which is the distance between the front upper end of the sidewalls (one of which is shown at 142) and the front edge "u" of the transition panel 116 (which is also the lower front edge of the upper portion of the sidewalls).

We'll first look at the dimension "j" which should be no greater than the height dimension "h" of the housing access opening 94. The front wall panel 98 (not shown in FIG. 10B) which closes the opening 94 has a moderately greater height than the opening 94 to accomplish its closure function and to fit within its related mounting lips to properly position the strainer cup 34.

The clearance dimension e should be no greater than the height dimension h of the opening 94 so that the strainer cup 34 can be removed from the housing 32. It will be noted that as the depth dimension c of the lower section 108 of the strainer cup decreases so that the point p moves rearwardly, the point t could accordingly be moved further upwardly, if the dimension e is to remain constant. Conversely, if the depth of the dimension c of the lower portion of the strainer cup is increased so that the point t moves toward the point u (see FIG. 10B, with the dimension e being constant, the location of p is lowered, so that the overall effective volume of the upper strainer cup section decreases since the location of the upper edge of the rear wall 136 is lowered, relative to the height of the edge t.

To express this relationship in mathematical terms (reference being made to FIG. 10C also, the height dimension i of the upper edge p of the rear panel 136 that extends above the level of the transition flange 116 is equal to sin v (e) (the angle "v" being the angle at which the vertical axis of the strainer cup is slanted from the vertical axis y of the housing 32, when the strainer cup is in the escape position).

To relate this to the depth dimension c, $$e = c/\sin v,$$

and $$I = \cos v(i).$$

The dimension f-1 is given by the formula:

$$f(1) = \frac{(d)(h)}{c}$$

The distance f-(2) varies in accordance with the following formula:

$$f(2) = \frac{(d)(h)}{k}$$

Thus, it can be appreciated that as the depth dimension c diminishes the angle "v" diminishes, and the dimensions f(1) and f(2) increase, thus increasing the overall height dimension of the lower strainer cup portion.

To summarize the practical results of this analysis, when the depth dimension c of the lower portion of the strainer cup 34 is decreased, the volume of the upper strainer cup portion is increased since the rear edge p of the rear panel 136 is moved upwardly, thus increasing the overall capacity of the upper portion of the strainer cup. At the same time, the height dimension of the lower strainer cup portion is increased. However, the depth dimension c also decreases which has the effect toward diminishing the volume of the lower strainer cup portion. On the other hand, when the depth dimension c is the lower strain cup portion is increased, just the opposite happens.

This is demonstrated graphically in FIG. 10D, where there is shown a first configuration 34a of the strainer cup where the depth dimension c of the lower portion of the strainer cup is one half of the dimension g of the upper strainer cup portion which is equal to the depth dimension d of the housing. Then at 34b, there is shown a strainer cup configuration where the depth dimension c of the lower strainer cup portion is ⅝ths of the depth dimension of the upper strainer cup portion, also shown at "g". Calculations of the volumes indicate that the configuration shown at 34a has a volume slightly greater than the total volume at the configuration shown at 34b. However, the configuration at 34b may have more convenience in that the overall height dimension of the lower portion of the strainer cup is somewhat less, thus making it somewhat easier to remove from the housing 32.

Also, while the lower front wall portion 120 is shown vertically aligned, the front wall 120 could have a downward and forward slant so that the lower edge of the lower front wall portion would be adjacent to the front wall of the housing in the collecting position of FIG. 4, in which case the upper edge of the lower front wall portion 120 would have to be moved forwardly toward the pre-removal position as the strainer cup is being rotated toward its pre-removal position.

Reference is made to FIG. 10B where there are shown three different dimensions, j-1, j-2 and j-3. The dimension j-1 extends only to the edge q which is the bottom of the back wall 136. It is noted that by extending the back wall 136 at a slant down to the edge r, the overall depth dimension increases to j-2, thus adding a certain amount of volume to the lower portion of the strainer cup. The theoretical lower limit where the depth of the lower strainer cup cannot be made longer without interfering with its ability to be removed from the housing is indicated at r-1, with the depth dimension being shown at j-3. It is evident that it would be undesirable to extend the lower wall 126 to this extreme position where the lower wall 126 would then have a dimension of zero, since the debris would be caught in the tight corner formed at r-1. What is shown in FIG. 10B is a reasonable compromise for the position of the lower wall 126.

Figure 15:
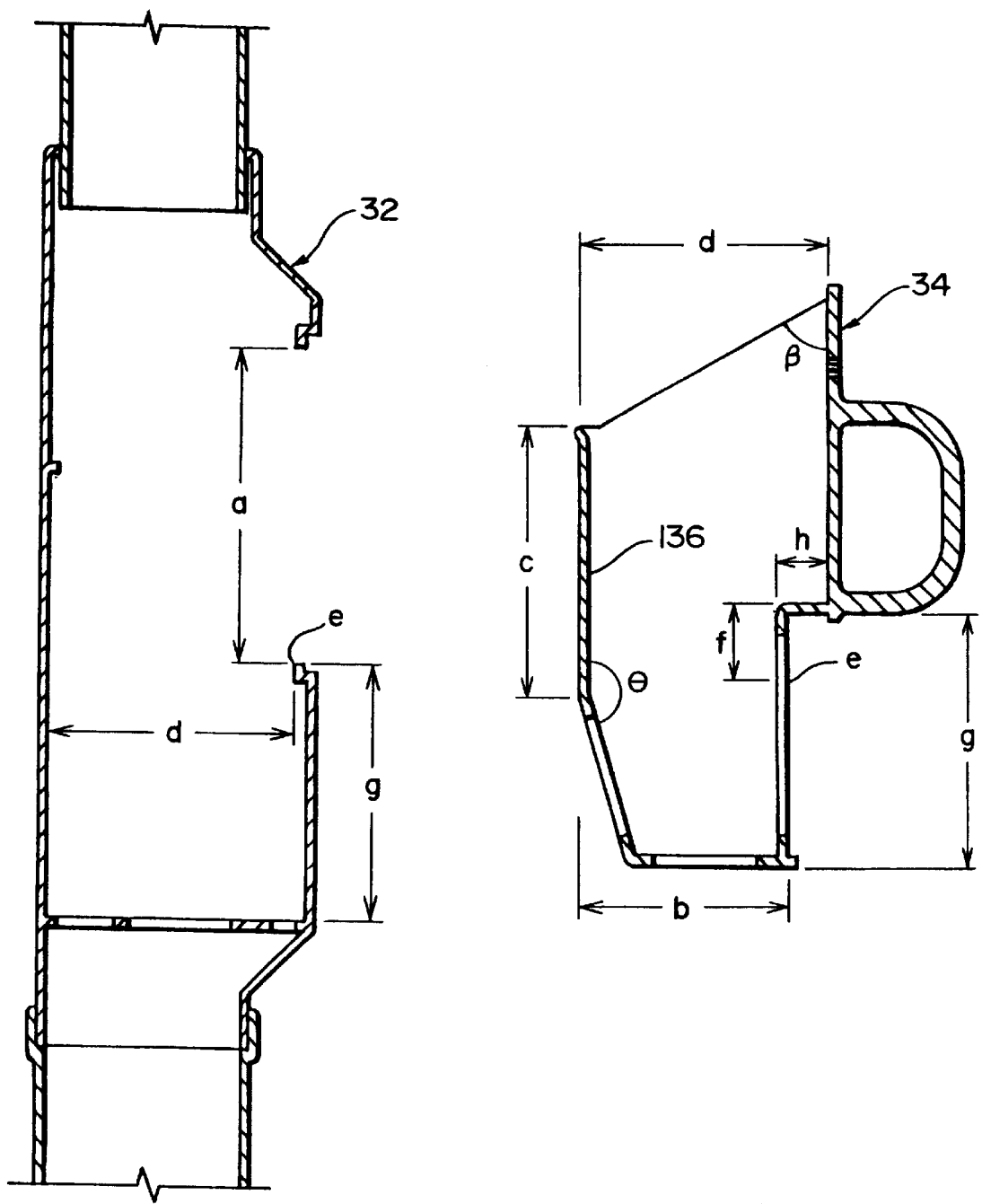
FIG. 15 is a longitudinal sectional view of the invention indicating various dimensional designations thereof.

A further analysis along somewhat different lines was conducted to describe this, reference is first made to FIG. 15. A different arrangement of letter designations are used in FIG. 15, so the letter designations in FIG. 15 do not correspond to those of FIGS. 10a to 10d.

Referring to FIG. 15, the first of these design constraints is a function of the height (a) of the access opening 94 and the depth of the strainer basket (b). The two dimensions define an escape angle θ at the interior intersection of the rear wall and the slanted wall that is defined mathematically as:

$$\theta = 180° - \arcsin\left(\frac{b}{a}\right)$$

After choosing the depth (d) of the strainer cup housing 32, the maximum length 9c) of the rear wall 136 of the strainer cup 34 can be found mathematically by the formula:

$$c = \frac{d \cdot a}{b}$$

The maxima defined by these formulas permit the strainer cup 32 to be removed from (and inserted into) the strainer cup housing through the access opening (a). The choice of the final location of a variable pivot point (e) sets the length of an overhang segment (f) and defines (together with the values determined above) a positioning angle β that determines the location of the rear wall panel 136 relative to the front wall panel 98 of the strainer cup 34. It is this position of the rear wall panel 136 that allows the cup 34 to be rotated into the position required for the cup 34. The positioning angle β, found using the formula:

$$\beta = \arcsin\left(\frac{d}{\sqrt{d^2 + 2 \cdot a^2 - b^2 - 2 \cdot \sqrt{a^2 - b^2} \cdot f - 2 \cdot \sqrt{a^2 - b^2 \cdot a} + f^2 + 2 \cdot f \cdot a}}\right)$$

All the information necessary to design the strainer cup is now available. The method of designing the strainer cup 34 is best described by example, referring to FIGS. 11A–G. In the preferred embodiment, the selection of the values for these measurements is partially based on the dimensions of the downspout 12, but the protrusion walls 76, 78 described above permit some flexibility in setting the values for the strainer cup 34 and housing 32. Other considerations in setting these initial values may be the desired size of the end product, the volume of debris sought to be retained, the cost of producing the product, etc.

For the purpose of providing an example only, the following values are chosen to roughly correspond to the measurements used in the Figures:

| Description | Label | Value |
| --- | --- | --- |
| Height of Access Opening | a | 48 mm |
| Depth of Strainer Cup Basket | b | 34 mm |
| Depth of Strainer Housing | d | 40 mm |
| Length of Overhang Segment | f | 10 mm |
| Length to Support Platform | g | 40 mm |

Using the formulas set forth above the following values are computed:

| Description | Label | Value |
| --- | --- | --- |
| Escape Angle | θ | 134.9° |
| Length of Rear Wall | c | 57 mm |
| Positioning Angle | β | 58.9° |
| Length of Transition Wall | h | 6 mm |

With these values, the strainer cup can be drawn according to the following steps, which are illustrated in FIGS. 10(*a–g*).

Figure 11A:
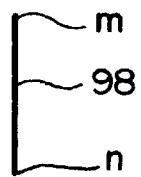
FIGS. 11(a–f) are a series of schematic drawings showing the effect that changing some of the dimensions of the strainer assembly has on the design of the strainer cup.

(i) Draw the front wall 98 from a topmost point (m). Because the front wall panel 98 is intended to act as a cover for the access opening 94, the length of the front wall panel 98 is approximately equal the height of the access opening 94. (FIG. 11*a*). In the actual embodiment of the invention, the length of the front wall panel is slightly longer than (a) because the front wall panel 98 fits within the circumferential channel 96.

Figure 11B:
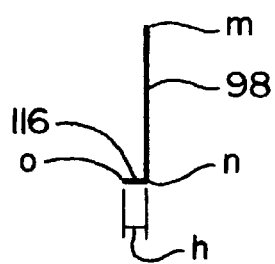

(ii) Draw the transition wall 116 perpendicular to the front wall panel 98 at its lower end point (n). The length (h) of the transition wall 116 is the difference between the depth (d) of the strainer cup housing 32 and the depth (b) of the strainer cup 34. (FIG. 11*b*).

Figure 11C:
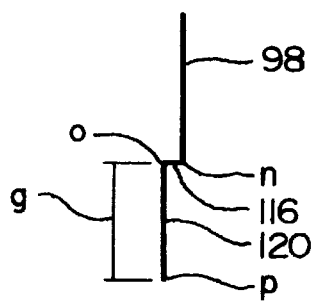

(iii) Draw the lower front mesh wall 120 perpendicular to the transition wall 116 at its reward end point (o) and ending at endpoint (p). The length (g) of the lower front wall 120 is equal to the length (g) from the bottom edge 224 of the access opening 94 to the top surface 167 of the support platform 166. (FIG. 11*c*).

Figure 11D:
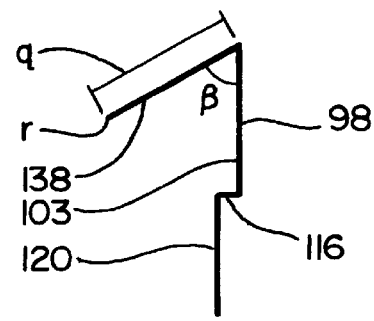
Figure 11E:
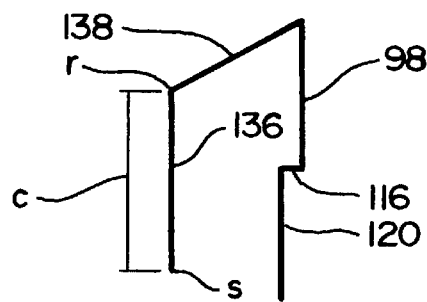

(iv) From the topmost point (m) of the front wall panel 98, draw a line 138 at the positioning angle β relative to a reward surface (103) of the front wall panel 98 with a length equal to q=d/sinβ. (FIG. 11*d*).

(v) From the lower rearward endpoint (r) of this line 138, draw the rear wall panel 136 parallel to the front wall panel 98 with a length (c) equal to c=(d·a)/b. (FIG. 10*e*).

Figure 11F:
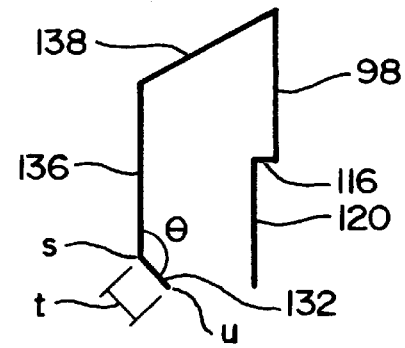

(vi) From the lowermost endpoint (s) of the rear wall panel 136, draw the slanted mesh rear wall 132 at the escape angle α relative to an interior surface 137 of the rear wall panel 136 with a length (t) equal to t=a+g−c−d/tanα. (FIG. 11*f*).

Figure 11G:
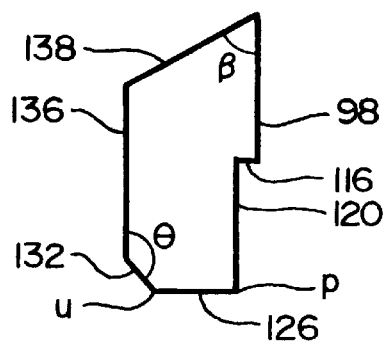

(vii) From the endpoint (u) of the slanted mesh wall 132, draw the bottom mesh wall 126 to the lowermost endpoint (p) of the lower front mesh wall 120. (FIG. 11*g*).

Figure 11H:
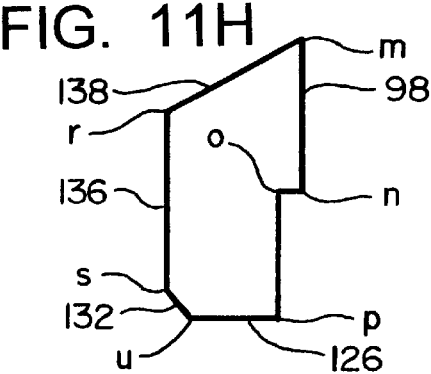
Figure 11I:
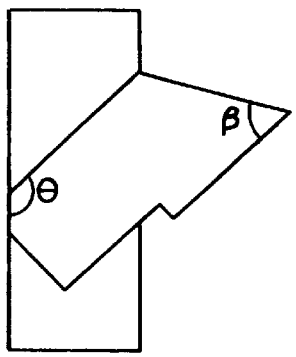
Figure 11J:
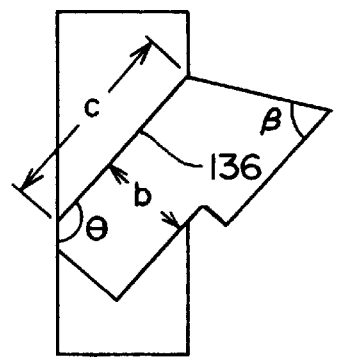
Figure 11K:
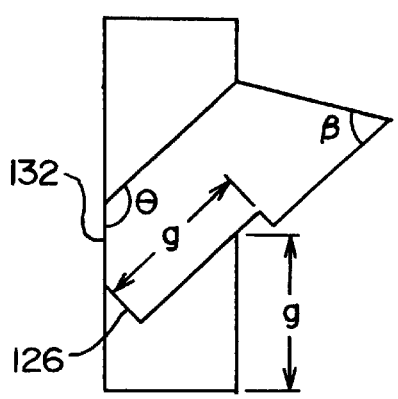
Figure 11L:
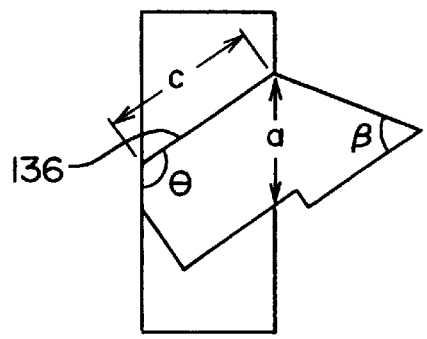
Figure 11M:
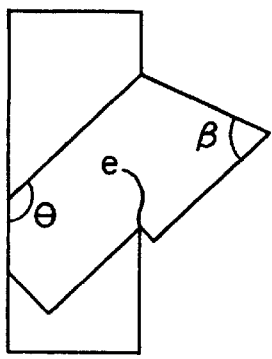
Figure 11N:
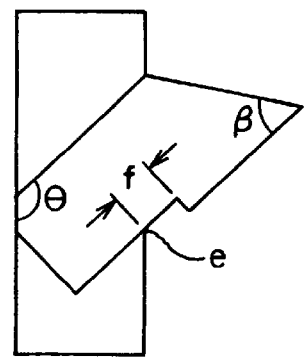

(viii) The maximum outline of the strainer cup 34 is now complete and comprised of the area contained within points (mrsupn). (FIG. 11*h*).

A simple computer program written in Microsoft Visual Basic to draw the side profile of the strainer cup 34 and the housing 32 according to this method is included with the Figures as Appendix 1.

As with all calculations described, it is preferable to adjust the results to provide a generous tolerance to allow for easy operation of the invention. Considering these tolerances, there are minor embellishments (e.g., tangs 232 and 234) that can be added to the strainer cup 34 for aesthetic or other reasons even if they exceed the maximum dimensions of the strainer cup 34 outline (mrsupn) without effecting the removal or insertion of the strainer cup 34 into the strainer housing 32.

From the forgoing, several other design constraints are apparent. With reference to FIG. 15, first the depth (b) of the strainer cup basket 108 may not exceed the depth (d) of the housing 32 or it would never fit into the housing 32. Second, the depth (b) of the strainer cup basket 108 may also not exceed the height (a) of the access opening 94 or it could never be inserted or removed through that opening 94. Third, to align the front panel 98 of the strainer cup 34 with the access opening 94, the length (g) of the lower front mesh wall portion 120 can not be longer than the distance from the platform 166 to the bottom 224 of the access opening 94. With these constraints in mind and the formulae set forth above, a strainer cup 34 according to the invention can be created with both volume and aesthetics in mind. Other design constraints will become evident from the application of the formulas and method of design discussed above with minor experimentation.

The effect of changing some of the variables in the design of the strainer cup 34 is shown in FIG. 11(*i–n*). FIG. 11*i* shows the strainer cup and housing as dimensioned in the previously discussed example and is used as a reference for the modifications made in the in FIGS. 11(*j–n*). In FIG. 11*j*, the width (b) of the strainer cup 34 has been reduced. This increases the maximum length (c) of the rear wall panel 136, increases the escape angle θ, and increases the positioning angle β. In FIG. 11*k* the height (g) to the platform 16 is increased. While the escape angle θ, the positioning angle β and the rear wall panel 136 all remain the same values as in FIG. 11*i*, the slanted mesh wall portion 132 is much longer and the bottom mesh panel 126 is considerably shorter. The effect of decreasing the height (a) of the access opening 94 is shown in FIG. 11*l*. This shortens the rear wall panel 136, decreases the escape angle θ and decreases the positioning angle β. Finally, the effect of altering the overhang segment (f) or the variable pivot point (e) is shown in FIGS. 11*m–n*. If the overhang segment (f) is eliminated, as in FIG. 11*m*, the positioning angle β becomes much greater in order to allow the cup 34 to be moved into the position to escape. On the other hand, if the overhang segment (f) is increased by sliding the variable pivot point (e) downwardly, the positioning angle β is significantly reduced as is shown in FIG. 11*n*.

It should be noted that the outline (mrsupn) of the strainer cup 34 (See FIG. 12) drawn in the above example defines its maximum dimensions. However, any shape strainer cup 34 that generally fits into the strainer cup outline (mrsupn) discussed above with reference to FIG. 11(*a–g*) is within the scope of this invention. For instance, the preferred embodiment of the strainer cup 34 depicted in the Figures does not conform exactly to the outline (mrsupn), but it does fit within the design constraints and formulae described.

Figure 14:
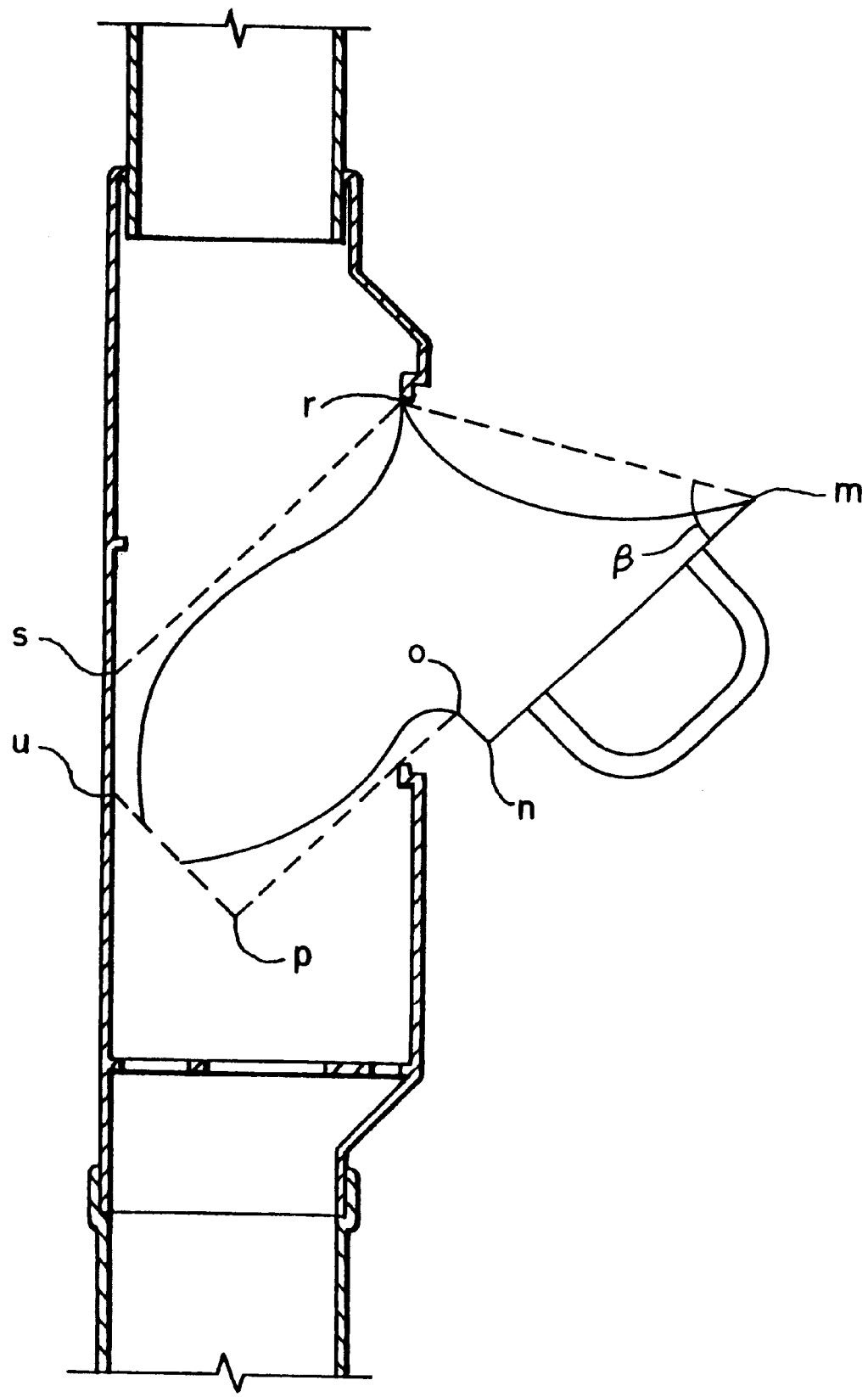
FIG. 14 is a schematic illustration of the many alternative embodiments possible for the design of the strainer cup.

Similarly, as shown in FIG. 14, another embodiment of a strainer cup 34 with a rounded basket could still be used as long as the design constraints listed above are met.

Figure 5C:
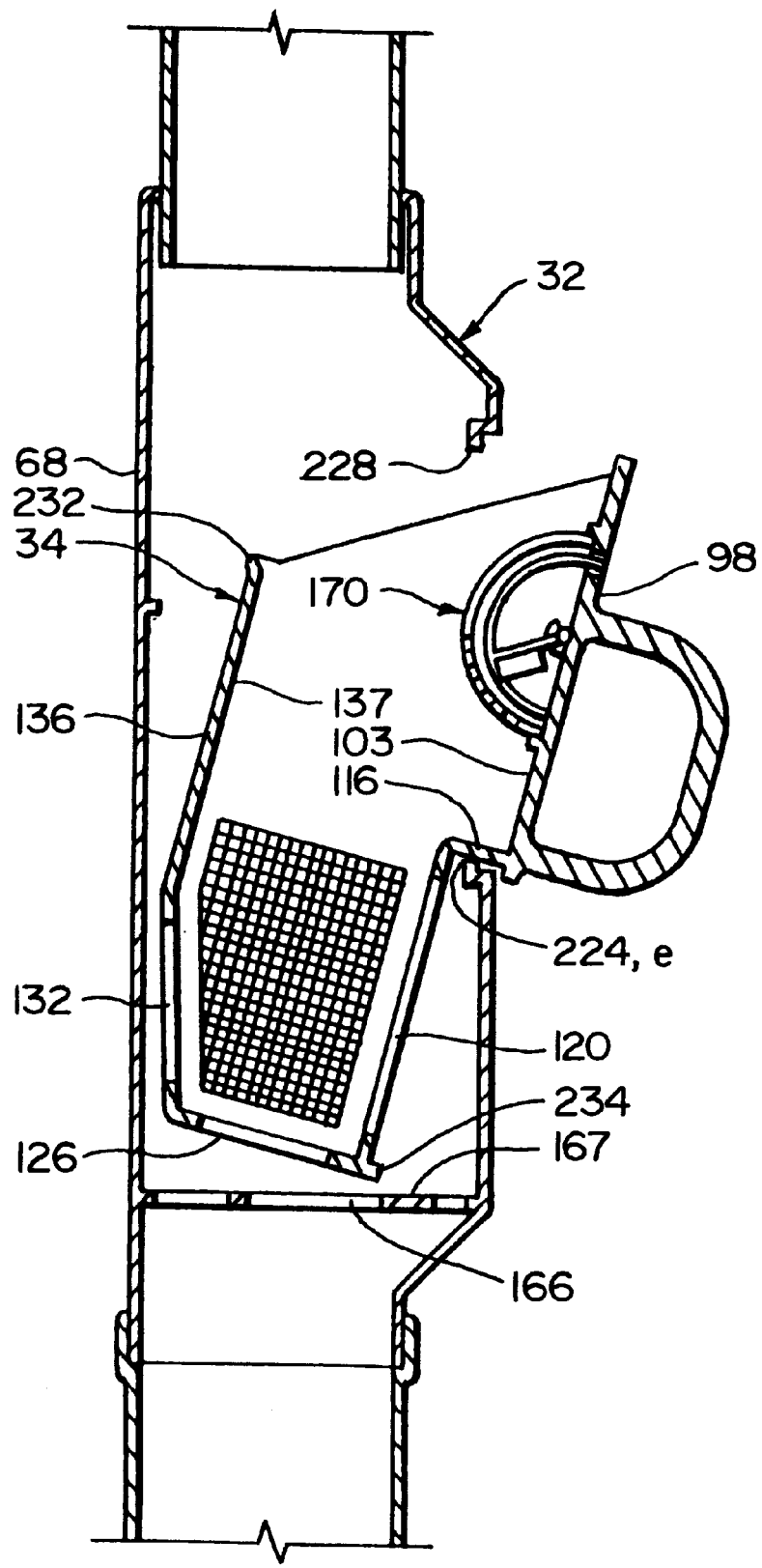

The method for removing the strainer cup 34 from the strainer housing 32 is illustrated in FIGS. 5a through 5g. In FIG. 5a, the strainer cup 34 is in its operating position inside the strainer housing 32. The rear wall panel 136 abuts, or nearly abuts, the rear wall panel 68 of the strainer housing 32. The top (r) of the rear wall panel 136 is in position below the tang 164, which helps to initially position the strainer cup 34 and to keep it in position. As shown in the drawing, the right 148 and left 142 side walls can be formed to provide a small surface 226 parallel to the depth axis that fit under the tang 164. The bottom mesh wall 126 rests on the support platform 166 and the front wall panel 98 of the strainer cup 34 is resident in the circumferential channel 96 surrounding the access opening 94. In this position, the rain water drains from the downspout 12 into the strainer cup 34 where the debris is trapped in the strainer basket 108 and the rain water continues through the perforations in the mesh on to the drain tile 14.

When the indicator 174 displays and alerts the building owner that the strainer cup 34 is full of debris, the debris is emptied by grasping the handle 104 and pulling the strainer cup 34 slightly forward. As is shown in FIG. 5b, pulling the strainer cup 34 forward dislodges the front wall panel edges 156, 158, 160, 162 from the circumferential channel and pulls the upper edge (r) of the rear wall panel 136 out from under the tang 164 located on the back wall 68 of the housing 32. Free from the circumferential channel 96 and the positioning tang 164, the strainer cup 34 can now be rotated forwardly and downwardly as shown in FIG. 5c.

Figure 5D:
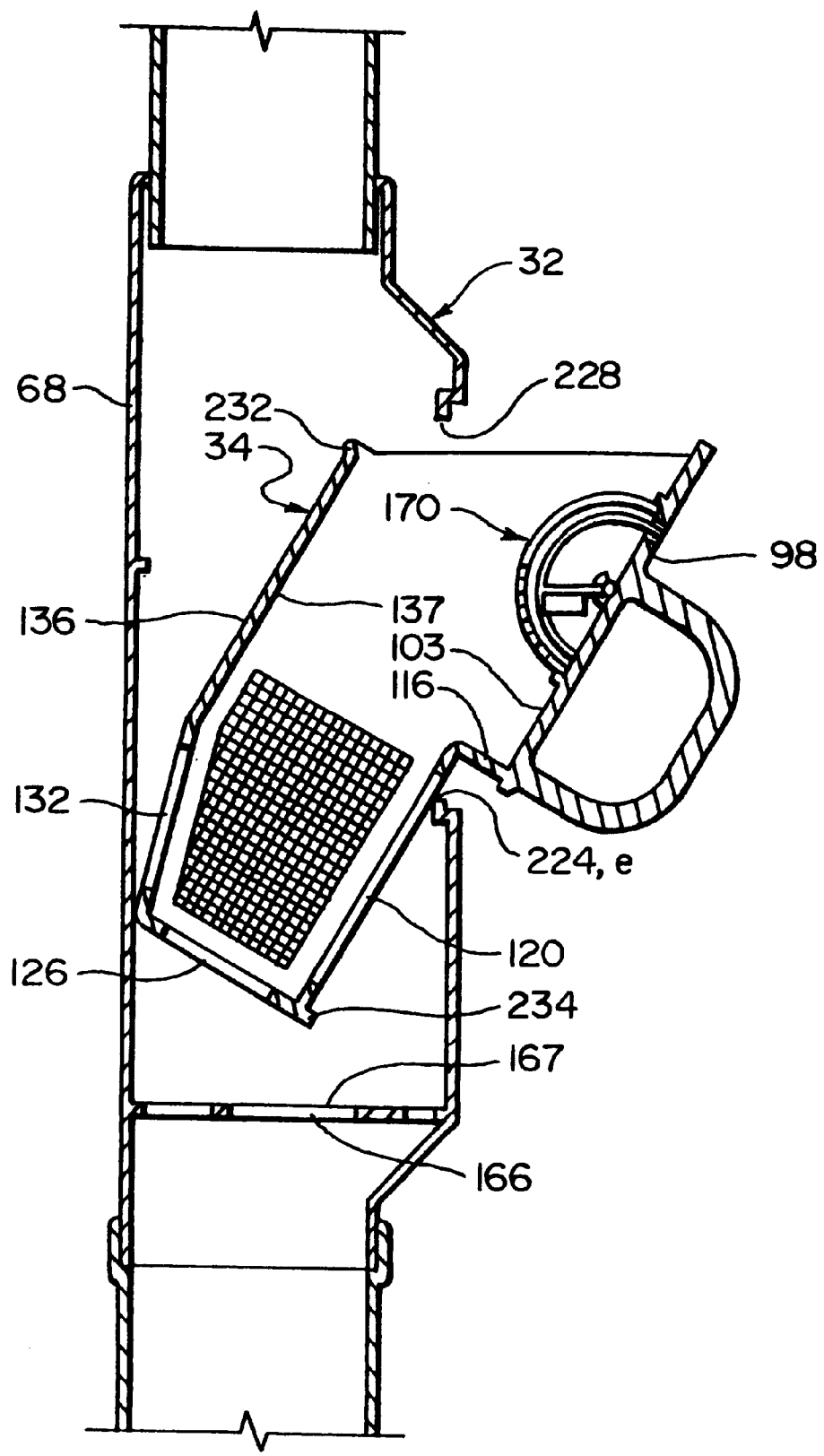
Figure 6:
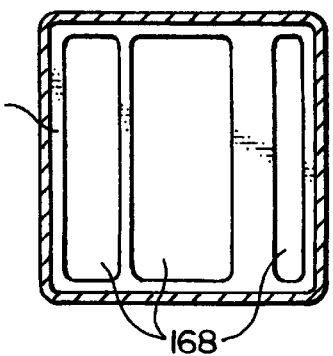
FIG. 6 is cross-sectional view of the strainer housing exposing the support platform as viewed from the top of the invention and taken along line 6—6 as shown in FIG. 4.

In this position, the lower edge 224 of the opening in the strainer housing 32 contacts the lower mesh wall 120 and acts as a variable pivot line (e) about which the strainer cup 34 is rotated. In FIG. 5d, the upper forward part of the strainer cup 34 is still being rotated forward and downwardly, but the lower part of the cup 34 is also being lifted forwardly and upwardly. This forward and upward lifting of the strainer cup 34 causes the pivot line (e) to slide downwardly along the lower front mesh wall. The pivot line (e) and the rear edge of the bottom mesh wall 126 essentially define a segment (et) between them that shortens as the strainer cup 34 is lifted from the strainer housing 32 and the pivot line (e) correspondingly slides down the lower front mesh wall 120. This provides a shorter turning radius as the pivot line (e) is moved down the lower front mesh wall 120.

Figure 5F:
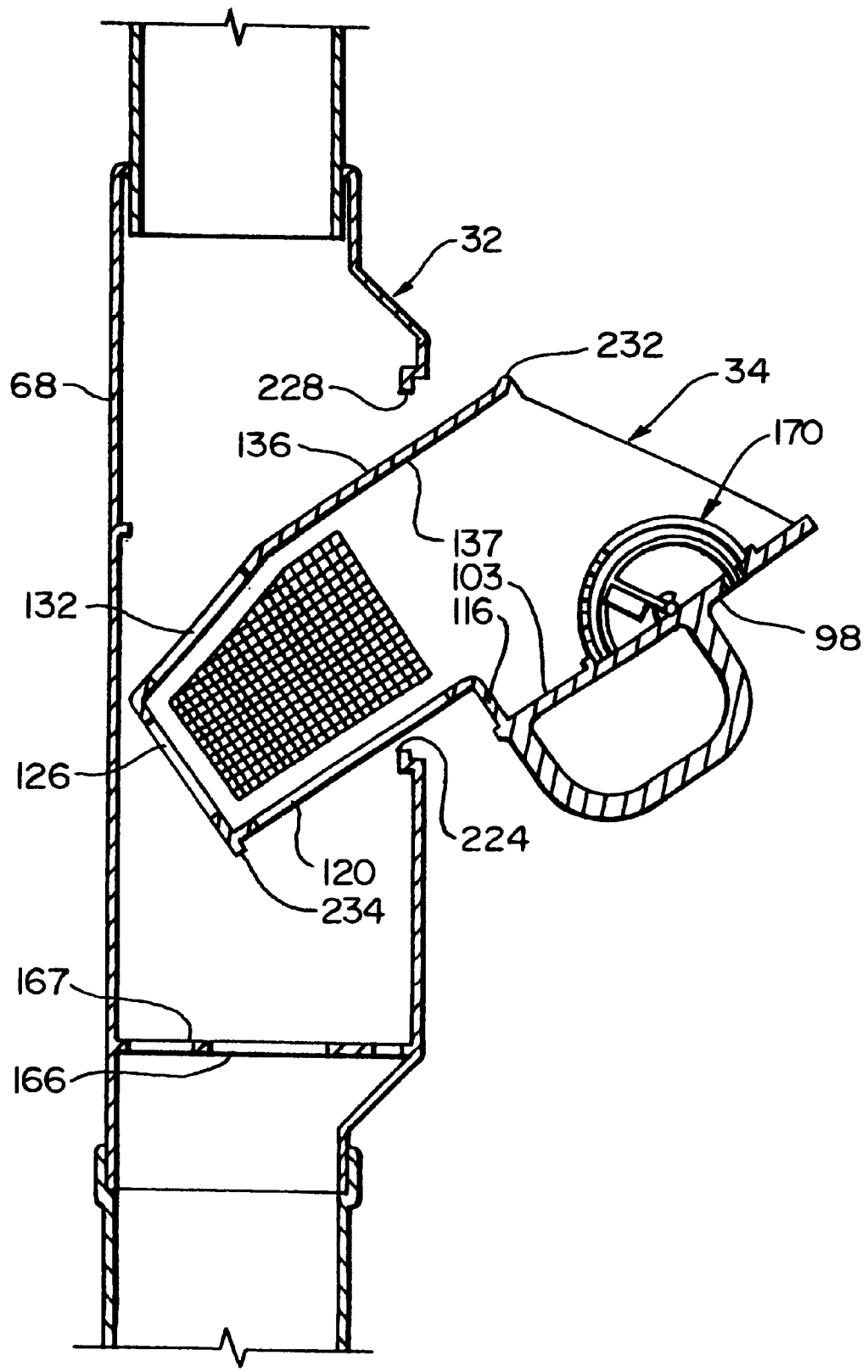
Figure 5G:
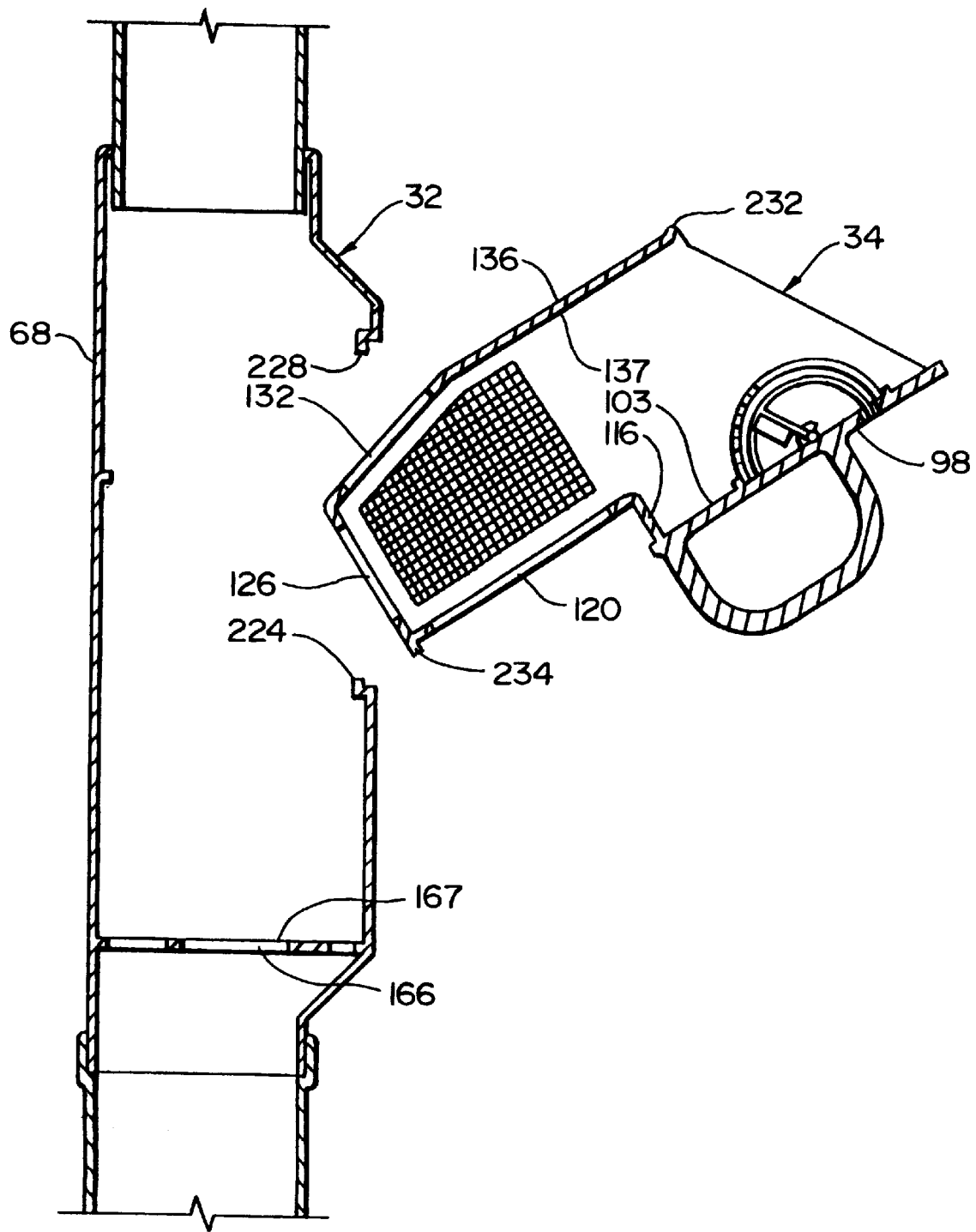

In FIG. 5e, the top edge (r) of the rear wall 136 just clears the top edge 228 of the access opening 94. If the cup 34 has been designed according to the method described above, the strainer cup can now be removed from the strainer housing 32 by pulling the strainer cup 34 outwardly and upwardly as shown in FIG. 5f until the bottom mesh wall 126 clears the housing 32 as illustrated in FIG. 5g.

The installation of the debris trap assembly 10 will now be described with reference to FIG. 1. To install the debris trap assembly 10 in an existing downspout 12, the installer removes a lower portion of existing downspout 12 which is equivalent to the total length of the debris trap assembly 10 less the portion of the downspout 12 that will telescopically fit into the upper collar adapter 58 of the strainer housing 32 and the portion of the drain tile 14 that will fit into the drain tile adapter 66. The debris trap assembly 10 is tilted slightly while aligning the upper collar adapter of the strainer housing 32 with the newly cut bottom of the existing drainpipe 26. Once aligned, the housing 32 is pushed upwardly so that the strainer housing 32 telescopes over the downspout 12. The debris trap assembly 10 is then rotated from the slight tilt until the drain tile adapter 66 is directly above the drain tile 14. Once in this position, the debris trap assembly 10 is lowered so that the drain tile adapter 66 telescopically fits over the drain tile 14. The debris trap assembly 10 is then secured to the building 18 by driving screws through mounting holes 222. After the strainer cup 34 is placed into the strainer housing 32, the installation is complete. Installation of the debris trap assembly 10 in new construction is done in the much the same way, although the downspout 12 would probably previously been cut to a length that anticipates the installation of the debris trap assembly 10.

In FIG. 3, the debris trap assembly 10 is shown installed between the downspout 12 and the drain tile 14. The upper collar adapter 48 of the strainer housing 32 has been telescopically placed over the lower portion 220 of the downspout 12, the lower end adapter 54 of the strainer housing 32 has been inserted into the adapter collar 58 of the extension member 62, and the drain tile 14 adapter has been connected to the drain tile 14. The strainer cup 34 has been placed into its operational position inside of the strainer housing 32. Preferably, the strainer housing 32 is positioned at about waist height, so that the cup 34 can be easily reached by an average size individual.

The debris trap assembly 10 is preferably made from plastic, such as PVC. Plastic is preferable because the strainer cup 34 can be cast in such a way that the perforated mesh surfaces 120, 126, 132, 146, 152 and, the brackets 182, and the water transmitting openings 168 are all integral. Of course, a mesh screen made from a material such as aluminum could be used to form the perforated mesh surfaces 120, 126, 132, 146, 152 but at much greater cost.

While this invention has been described in terms of a preferred embodiment, it is contemplated that persons reading the preceding description and studying the drawing will realize various alterations, permutations and modifications thereof It is therefore intended that the following appended claims are interpreted as including all such alterations and modifications as fall ithin the true spirit and scope of the present invention.

APPENDIX 1

```
Private Sub Command1_Click()
Dim a, b, d, f, g As Integer
Dim x As Double
'clear the form
Form2.Cls
'Scaling multiple - form is about 5300 by 6300 twips
multiple = 25
startx = 3000
starty = 40
Form2.DrawWidth = 1
'get and scale the initial values
a = CInt(Text1.Text)*multiple 'opening
b = CInt(Text2.Text)*multiple 'strainer width
d = CInt(Text3.Text)*multiple 'total width
f = CInt(Text4.Text)*multiple 'overhang
g = CInt(Text5.Text)*multiple 'height to platform
'find theta
x = (b/a)
'to get the arcsin of theta
theta = Atn(x/Sqr(-x*x + 1))
'find beta
x = (d/(Sqr(d2 + 2 * a2 - b2 - 2*Sqr(a2 - b2)*f - 2*Sqr(a2 - b2)*a + f2 + 2 * f * a)))
'to get the arcsin of beta
beta = Atn(x/Sqr(-x * x + 1))
'draw front panel
Form2.Line(startx,starty)-Step(0,a)
```

APPENDIX 1-continued

```
'transition wall is d-b
twall = d - b
'draw transition wall
Form2.Line-Step(-twall,0)
'draw the lower wall
Form2.Line-Step(0,g)
'keep track of that x position till later
endx = Form2.CurrentX
endy = Form2.CurrentY
'Draw slanted line on top of cup
topcutout = d/Tan(beta)
Form2.Line(startx,starty)-Step(-d, topcutout)
'draw back wall
backwall = (d * a)/b
Form2.Line-Step(0, backwall)
'draw slanted wall
'a+g = topcutout + backwall + sidecutout
sidecutout = a + g - topcutout - backwall
'using the supplement of the escape angle
PI = 3.141592654
alpha = PI - theta
bottomcutout = sidecutout * Tan(alpha)
Form2.Line -Step(-bottomcutout, sidecutout)
'draw bottom wall
Form2.Line -(endx, endy)
'draw a sample housing a little below figure
newendy = endy + 20 * multiple
newendx = endx
Form2.Line(newendx, newendy)-Step(0,20 * multiple)
'drop down distance of opening
'then draw length to platform
Form2.Line Step(0,a)-Step(0,g)
'draw platform
Form2.Line -Step(-d,0)
'draw backwall
Form2.Line -(newendx - d, newendy)
'complete the box for show
Form2.Line -Step(d,0)
End Sub
```

What is claimed:

1. A debris trap assembly adapted to remove debris from rain water that is descending through a downspout, said assembly comprising:

a. a housing which comprises:
  i. an upper end with an upper inlet opening to receive rain water and debris from the downspout;
  ii. a lower end having a lower discharge opening to discharge the rain water;
  iii. an intermediate section located between said upper and lower ends, comprising wall means defining a containing region, said wall means comprising front and rear generally vertical walls spaced from one another by a predetermined depth dimension "d";
  iv. said housing having a vertical axis "y" extending from said lower end to said upper end; and
  v. said front wall having a front access opening having an upper edge "a" and a lower edge "b" defining a height dimension "h";
 b. a debris collecting container adapted to be removably mounted in the containing region of the housing at a collecting location and defining a debris containing chamber, said container comprising:
  i. a front wall, a rear wall, side walls and a bottom wall;
  ii. an upper containing portion which in the collecting location is positioned at a level of said access opening and has an upper inlet portion to receive the rain water and the debris, said upper containing portion having an upper front wall portion and a rear upper wall portion;
  iii. a lower containing portion which, in the collecting location, is positioned at a level to extend below said access opening, said lower containing portion having a lower front wall portion of said front wall and a lower rear wall portion of said rear wall;
  iv. said container having screen means at least over a portion of said container walls to contain debris and permit rain water to flow therethrough;
  v. said container having a collecting position where the container in the collecting location is positioned with the upper inlet portion positioned and aligned to receive the rain water and debris;
  vi. said container having a pre-removal position where at least an upper end of the lower front wall portion is moved forwardly to be adjacent to the lower edge "b" at the access opening, and the forward portion of the upper containing portion is moved at least partially through the access opening, and the container is rotated about the lower edge "b" at the access opening so that a lower end portion of the lower containing portion is adjacent to the rear wall of the housing so that the rear wall is aligned relative to the housing upper edge at the access opening in a manner that the rear wall of the container and the front lower wall portion are aligned with the access opening so that the container can be moved with a linear component of travel through the access opening so as to be able to be emptied of debris, and then reinserted to its collecting location.

2. The assembly as recited in claim 1, wherein said lower containing portion has a front to rear depth dimension "c" at an upper portion of said lower containing portion that is less than the depth dimension "d" so that with the upper front wall portion of the lower containing portion being positioned adjacent to the front wall of the housing, and with the lower rear portion of the lower container portion being spaced from the rear wall of the housing, the container can be rotated to the pre-removal position where the lower rear portion of the container is adjacent to the rear wall of the housing.

3. The assembly as recited in claim 1, wherein there is an upwardly extending maximum removal dimension e extending from the upper end of the lower forward wall portion of said lower container portion to an upper edge location of said upper containing portion, which dimension e is no greater than the height dimension "h" of the access opening.

4. The assembly as recited in claim 1, wherein said container has a first lower clearance dimension f(1) that extends from the upper end of the rear wall of the container to a lower location of the rear wall of the container that is no greater than a value equal to:

$$\frac{(d)(h)}{c}.$$

5. The assembly as recited in claim 1, wherein
 a. said lower containing portion has a front to rear depth dimension "c" at an upper portion of said lower containing portion that is less than the depth dimension "d" so that with the lower front wall portion of the lower containing portion being positioned adjacent to the front wall of the housing, and with the lower rear portion of lower container portion being spaced from the rear wall of the housing, the container can be rotated to the pre-removal position where the lower rear portion of the container is adjacent to the rear wall of the housing;
 b. there is an upwardly extending maximum removal dimension e extending from the upper end of the lower forward wall portion of said lower container portion to an upper edge location of said upper containing portion, which dimension e is no greater than the height dimension "h";

c. said container has a first lower clearance dimension f(1) that extends from the end of the rear wall of the container to a lower location of the rear wall of the container that is no greater than a value equal to $$\frac{(d)(h)}{c}.$$

6. The assembly as recited in claim 1, wherein the upper front wall portion of the upper containing portion is, with the container in the collecting position, positioned over the front access opening to close said front access opening.

7. The assembly as recited in claim 6, wherein said housing and said container have interfitting lip means to retain said front wall of the upper container portion, with the container in its collecting location, so that said front wall covers the access opening.

8. The assembly as recited in claim 7, wherein said front wall has at lease one dimension extending along said front wall greater than the dimension of the access opening, to prevent said front wall from passing through said access opening, as a means of positioning said container in said collecting location.

9. The assembly as recited in claim 1, wherein said upper front wall portion of the container is positioned at a more forward location relative the lower front wall portion of the container, and there is a transition wall portion having a horizontal alignment component and interconnecting a lower edge of the upper front wall portion and an upper edge of the lower front wall portion of the container.

10. The assembly as recited in claim 9, wherein the upper and lower rear wall portions of the container are substantially aligned with one another, and in the collecting location are positioned adjacent to the rear wall of the housing, and in the pre-removal position the rear wall of the container is slanted upwardly and forwardly toward the upper edge "a" of the front access opening.

11. The assembly as recited in claim 1, wherein a lower rear portion of the lower containing portion has a lower rear slanted wall portion having a downward and forward slant, whereby with the container in the pre-removal position, said lower rear wall portion is positioned adjacent to said rear wall of the housing.

12. The assembly as recited in claim 1, wherein said housing comprises at least one emergency drain means leading from an upper portion of the collecting region of the housing to a location exterior of the housing.

13. The assembly as recited in claim 1, further comprising an indicator assembly mounted to the strainer cup, said indicator assembly having float means operably positioned relative to the containing chamber to float upwardly as rain water in the chamber rises to a predetermined level, indicating means operably connected to the float means to move to a indicating position to indicate a predetermined upper level of the rain water in the containing chamber.

14. The assembly as recited in claim 13, wherein said indicating means has a first position where the indicating means is positioned within the container, and a second position where the indicating means is moved by the float means to an indicating position where the indicating means extends outwardly from said container.

15. The assembly as recited in claim 14, wherein said float member and said indicating member are interconnected, and rotatably mounted within said container, and said indicating means is angularly spaced from said float means in a manner that upwardly movement of said float means causes said indicator means to move with the lateral component of travel outwardly from said container to its indicating position.

16. The assembly as recited in claim 15, wherein said indicating means comprises an indicator housing positioned within said containing chamber, with the float means and the indicator means being rotatably positioned within the indicator housing so as to be isolated from the debris in the containing chamber, said indicating means being mounted to the upper front wall portion of the container, and said upper front wall having an opening through which said indicating means extends as the float moves upwardly to move the indicating means forwardly through the upper front wall of the container.

17. A method of removing debris from rain water that is descending through a downspout, said assembly comprising:
   a. positioning a housing in a flow path of the downspout so that:
      i. an upper end of the housing with an upper inlet opening is positioned to receive rain water and debris from the downspout;
      ii. a lower end of the housing having a lower discharge opening is positioned to discharge the rain water;
      iii. an intermediate section of the housing is located between said upper and lower ends, said intermediate section comprising wall means defining a containing region, said wall means comprising front and rear generally vertical walls spaced from one another by a predetermined depth dimension "d";
   b. said housing being characterized in that:
      i. said housing has a vertical axis "y" extending from said lower end to said upper end; and
      ii. said front wall has a front access opening having an upper edge "a" and a lower edge "b" defining a height dimension "h";
   c. providing a debris collecting container comprising:
      a front wall, a rear wall, side walls and a bottom wall, and defining a debris containing chamber;
   d. removably positioning said container in the containing region of the housing at a collecting location so that:
      i. an upper containing portion of the container is positioned at a level of said access opening and has an upper inlet portion to receive the rain water and the debris, said upper containing portion having an upper front wall portion and a rear upper wall portion;
      ii. a lower containing portion is positioned at a level to extend below said access opening, said lower containing portion having a lower front wall portion of said front wall and a lower rear wall portion of said rear wall;
      iii. screen means of said container is at least over a portion of said container walls to contain debris and permit rain water to flow therethrough;
      iv. said container is in a collecting position where the container in the collecting location is positioned with the upper inlet portion positioned and aligned to receive the rain water and debris;
   e. moving said container to a pre-removal position where at least an upper end of the lower front wall portion is moved forwardly to be adjacent to the lower edge "b" at the access opening, and the forward portion of the upper containing portion is moved at least partially through the access opening, and the container is rotated about the lower edge "b" at the access opening so that a lower end portion of the lower containing portion is adjacent to the rear wall of the housing so that the rear wall is aligned relative to the housing upper edge at the access opening in a manner that the rear wall of the container and the front lower wall portion are aligned with the access opening;

f. moving the container with a linear component of travel through the access opening from the containing region and emptying debris from the container.

18. The method as recited in claim 17, wherein said lower containing portion has a front to rear depth dimension "c" at an upper portion of said lower containing portion that is less than the depth dimension "d" so that with the upper front wall portion of the lower containing portion being positioned adjacent to the front wall of the housing, and with the lower rear portion of the lower container portion being spaced from the rear wall of the housing, the container can be rotated to the pre-removal position where the lower rear portion of the container is adjacent to the rear wall of the housing.

19. The method as recited in claim 17, wherein there is an upwardly extending maximum removal dimension e extending from the upper end of the lower forward wall portion of said lower container portion to an upper edge location of said upper containing portion, which dimension e is no greater than the height dimension "h" of the access opening.

20. The method as recited in claim 17, wherein said container has a first lower clearance dimension f(1) that extends from the upper end of the rear wall of the container to a lower location of the rear wall of the container that is no greater than a value equal to $$\frac{(d)(h)}{c}.$$

* * * * *